United States Patent
Seo et al.

(10) Patent No.: US 7,974,516 B2
(45) Date of Patent: Jul. 5, 2011

(54) RECORDING MEDIUM HAVING DATA STRUCTURE OF PLAYLIST MARKS FOR MANAGING REPRODUCTION OF STILL IMAGES RECORDED THEREON AND RECORDING AND REPRODUCING METHODS AND APPARATUSES

(75) Inventors: Kang Soo Seo, Kyunggi-do (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1122 days.

(21) Appl. No.: 10/653,245

(22) Filed: Sep. 3, 2003

(65) Prior Publication Data

US 2004/0047592 A1    Mar. 11, 2004

(30) Foreign Application Priority Data

Sep. 5, 2002    (KR) .......................... 10-2002-0053608
Sep. 16, 2002   (KR) .......................... 10-2002-0056235
Sep. 18, 2002   (KR) .......................... 10-2002-0056923

(51) Int. Cl.
H04N 9/80    (2006.01)
H04N 5/78    (2006.01)
H04N 5/84    (2006.01)
H04N 5/92    (2006.01)
H04N 5/93    (2006.01)
H04N 5/765   (2006.01)
H04N 5/783   (2006.01)
H04N 9/64    (2006.01)
H04N 9/88    (2006.01)
G11B 27/00   (2006.01)

(52) U.S. Cl. ......... 386/247; 386/200; 386/268; 386/280; 386/281; 386/324; 386/333; 386/334; 386/338; 386/344; 348/700; 348/701; 348/702; 369/83

(58) Field of Classification Search ................ 386/1, 46, 386/52–55, 95, 96, 121, 125–126, 69, E9.013; 348/700, 701, 702; 369/83

See application file for complete search history.

(56) References Cited

U.S. PATENT DOCUMENTS 5,854,873 A * 12/1998 Mori et al. ...................... 386/92

(Continued)

FOREIGN PATENT DOCUMENTS

AU    6672298    9/1998

(Continued)

OTHER PUBLICATIONS

International Search Report, dated Dec. 18, 2003.

(Continued)

*Primary Examiner* — Thai Tran
*Assistant Examiner* — Syed Y Hasan
(74) *Attorney, Agent, or Firm* — Harness, Dickey & Pierce, P.L.C.

(57) ABSTRACT

Provided are apparatuses and methods for reproducing a data structure for managing reproduction of still images recorded on a recording medium. In the recording medium, a data area stores at least first and second still images and a playlist area stores at least one playlist. The playlist includes mark information, and the mark information provides presentation information on the first and second images to allow for at least skipping from reproducing the first image to reproducing the second image.

35 Claims, 27 Drawing Sheets

U.S. PATENT DOCUMENTS

| | | | |
|---|---|---|---|
| 5,870,523 A * | 2/1999 | Kikuchi et al. | 386/95 |
| 5,884,004 A * | 3/1999 | Sato et al. | 386/98 |
| 5,907,658 A | 5/1999 | Murase et al. | |
| 5,999,698 A * | 12/1999 | Nakai et al. | 386/125 |
| 6,122,436 A | 9/2000 | Okada et al. | |
| 6,157,769 A | 12/2000 | Yoshimura et al. | |
| 6,266,483 B1 | 7/2001 | Okada et al. | |
| 6,285,826 B1 | 9/2001 | Murase et al. | |
| 6,308,005 B1 | 10/2001 | Ando et al. | |
| 6,341,196 B1 | 1/2002 | Ando et al. | |
| 6,353,702 B1 | 3/2002 | Ando et al. | |
| 6,369,835 B1 | 4/2002 | Lin | |
| 6,374,037 B1 | 4/2002 | Okada et al. | |
| 6,385,389 B1 * | 5/2002 | Maruyama et al. | 386/95 |
| 6,393,430 B1 | 5/2002 | Van Ryzin | |
| 6,400,893 B1 | 6/2002 | Murase et al. | |
| 6,442,337 B1 | 8/2002 | Okada et al. | |
| 6,470,460 B1 | 10/2002 | Kashiwagi et al. | |
| 6,493,504 B1 | 12/2002 | Date et al. | |
| 6,532,335 B2 | 3/2003 | Otomo et al. | |
| 6,574,419 B1 | 6/2003 | Nonomura et al. | |
| 6,580,870 B1 | 6/2003 | Kanazawa et al. | |
| 6,594,442 B1 * | 7/2003 | Kageyama et al. | 386/96 |
| 6,798,976 B2 | 9/2004 | Tsumagari et al. | |
| 6,823,010 B1 | 11/2004 | Curet et al. | |
| 6,829,211 B2 | 12/2004 | Sako et al. | |
| 6,856,756 B1 | 2/2005 | Mochizuki et al. | |
| 6,943,684 B2 | 9/2005 | Berry | |
| 6,999,674 B1 | 2/2006 | Hamada et al. | |
| 7,054,545 B2 | 5/2006 | Ando et al. | |
| 7,224,890 B2 | 5/2007 | Kato | |
| 7,236,687 B2 | 6/2007 | Kato et al. | |
| 7,477,833 B2 * | 1/2009 | Kato et al. | 386/125 |
| 2001/0000809 A1 | 5/2001 | Ando et al. | |
| 2001/0016112 A1 | 8/2001 | Heo et al. | |
| 2001/0043790 A1 | 11/2001 | Saeki et al. | |
| 2001/0046371 A1 | 11/2001 | Ando et al. | |
| 2002/0035575 A1 | 3/2002 | Taira et al. | |
| 2002/0085022 A1 | 7/2002 | Masuda et al. | |
| 2002/0110369 A1 * | 8/2002 | Mori et al. | 386/98 |
| 2002/0127001 A1 | 9/2002 | Gunji et al. | |
| 2002/0135607 A1 | 9/2002 | Kato et al. | |
| 2002/0135608 A1 | 9/2002 | Hamada et al. | |
| 2002/0145702 A1 | 10/2002 | Kato et al. | |
| 2002/0164152 A1 | 11/2002 | Kato et al. | |
| 2002/0172496 A1 | 11/2002 | Gunji et al. | |
| 2003/0014760 A1 | 1/2003 | Yamauchi et al. | |
| 2003/0235406 A1 | 12/2003 | Seo et al. | |
| 2004/0057700 A1 | 3/2004 | Okada et al. | |
| 2004/0141436 A1 | 7/2004 | Monahan | |
| 2004/0179820 A1 | 9/2004 | Kashiwagi et al. | |
| 2004/0184780 A1 | 9/2004 | Seo et al. | |
| 2004/0213552 A1 | 10/2004 | Kato | |
| 2005/0105888 A1 | 5/2005 | Hamada et al. | |
| 2005/0163463 A1 | 7/2005 | Schick et al. | |
| 2005/0196143 A1 | 9/2005 | Kato et al. | |
| 2005/0201718 A1 | 9/2005 | Kato | |
| 2005/0254363 A1 | 11/2005 | Hamada et al. | |
| 2006/0195633 A1 | 8/2006 | Plourde | |

FOREIGN PATENT DOCUMENTS

| | | |
|---|---|---|
| AU | 2003282415 | 6/2004 |
| CN | 1205503 | 1/1999 |
| CN | 1240293 | 1/2000 |
| CN | 1245957 | 3/2000 |
| CN | 1263672 | 8/2000 |
| CN | 1063863 | 3/2001 |
| CN | 1303094 | 7/2001 |
| CN | 1304533 | 7/2001 |
| CN | 1381137 | 11/2002 |
| DE | 69907758 | 2/2004 |
| DE | 60002774 | 3/2004 |
| EP | 0856849 | 8/1998 |
| EP | 0949825 | 10/1999 |
| EP | 0978994 | 2/2000 |
| EP | 1003337 | 5/2000 |
| EP | 1 045 393 A2 | 10/2000 |
| EP | 1041566 | 10/2000 |
| EP | 1056094 | 11/2000 |
| EP | 1102270 | 5/2001 |
| EP | 1 113 439 A2 | 7/2001 |
| EP | 1128386 | 8/2001 |
| EP | 0942609 | 10/2001 |
| EP | 1198133 A1 | 4/2002 |
| EP | 1204269 | 5/2002 |
| EP | 1300851 | 4/2003 |
| EP | 1550121 | 7/2005 |
| FR | 2581771 | 11/1986 |
| GB | 2 119 151 | 11/1983 |
| GB | 2119151 | 11/1983 |
| GB | 2359210 | 8/2001 |
| JP | 1-300777 | 12/1989 |
| JP | 5-137114 A | 6/1993 |
| JP | 5-137144 | 6/1993 |
| JP | 06-311481 | 11/1994 |
| JP | 07-057436 | 3/1995 |
| JP | 07-262646 | 10/1995 |
| JP | 09-017101 | 1/1997 |
| JP | 10-154373 | 6/1998 |
| JP | 11-213628 | 8/1999 |
| JP | 2000-004421 | 1/2000 |
| JP | 2000-020554 | 1/2000 |
| JP | 2000-041212 | 2/2000 |
| JP | 2000-059714 | 2/2000 |
| JP | 2000-251402 | 9/2000 |
| JP | 2000-333126 | 11/2000 |
| JP | 2001-052467 | 2/2001 |
| JP | 2001-069460 | 3/2001 |
| JP | 2001-078123 | 3/2001 |
| JP | 2001-086458 | 3/2001 |
| JP | 2001-103417 | 4/2001 |
| JP | 2001-155466 | 6/2001 |
| JP | 2001-157155 | 6/2001 |
| JP | 2001-167529 | 6/2001 |
| JP | 2001-216739 | 8/2001 |
| JP | 2001-231015 | 8/2001 |
| JP | 2001-285772 | 10/2001 |
| JP | 2002-056651 | 2/2002 |
| JP | 2002-082684 | 3/2002 |
| JP | 2002-158972 A | 5/2002 |
| JP | 2002-208258 | 7/2002 |
| JP | 2002-325221 | 11/2002 |
| JP | 2002-354424 | 12/2002 |
| JP | 2003-09090 A | 1/2003 |
| JP | 2003-016764 | 1/2003 |
| JP | 2003-045154 | 2/2003 |
| JP | 2003-299015 | 10/2003 |
| JP | 2004-336566 | 11/2004 |
| KR | 1998-0086030 | 12/1998 |
| KR | 1999-0070106 | 9/1999 |
| KR | 10-2000-0002840 | 1/2000 |
| KR | 10-2000-0002921 | 1/2000 |
| KR | 10-2000-0002922 | 1/2000 |
| KR | 10-2000-0014419 | 3/2000 |
| KR | 10-2000-0018987 | 4/2000 |
| KR | 10-2001-0013565 | 2/2001 |
| KR | 10-2001-0021485 | 3/2001 |
| KR | 10-2001-0027114 | 4/2001 |
| KR | 10-2001-0051295 | 6/2001 |
| KR | 10-2001-0066211 | 7/2001 |
| KR | 10-2002-0021402 | 3/2002 |
| KR | 10-2002-0064463 | 8/2002 |
| KR | 10-2003-0064546 | 8/2003 |
| TW | 517495 | 1/2003 |
| WO | WO 98/37699 | 8/1998 |
| WO | WO 99/53694 | 10/1999 |
| WO | WO 00/33532 | 6/2000 |
| WO | WO 00/55857 | 9/2000 |
| WO | WO 00/60598 | 10/2000 |
| WO | WO 00/74061 | 12/2000 |
| WO | WO 01/82608 | 11/2001 |
| WO | WO 01/82609 | 11/2001 |
| WO | WO 02/062061 | 8/2002 |
| WO | WO 2004/023234 | 3/2004 |
| WO | WO 2004/023484 | 3/2004 |
| WO | WO 2004/023485 | 3/2004 |

| | | |
|---|---|---|
| WO | WO 2004/066281 A1 | 8/2004 |
| WO | WO 2004/075194 A1 | 9/2004 |
| WO | WO 2004/086396 A1 | 10/2004 |

OTHER PUBLICATIONS

European Telecommunications Standard Institute, *"Digital Video Broadcasting (DVB); Subtitling systems"*, 1997 pp. 1-45.
European Search Report dated Jul. 30, 2008.
"Information technology-Generic coding of moving pictures and associated audio information: Systems", Jan. 12, 2000.
Japanese Office Action dated Sep. 24, 2008.
Japanese Office Action dated Sep. 16, 2008.
Chinese Office Action dated Aug. 8, 2008.
Japanese Office Action dated Jun. 10, 2008.
Japanese Office Action dated Jun. 20, 2008.
United States Office Action dated Jul. 9, 2008.
European Search Report dated Sep. 1, 2008.
Chinese Office Action dated Oct. 3, 2008 with English translation.
Australian Office Action dated Jan. 7, 2009.
European Office Action dated May 7, 2009.
Australian Office Action dated May 28, 2009.
European Office Action dated Jul. 30, 2009.
Australian Office Action dated Aug. 17, 2009.
Japanese Office Action dated Oct. 20, 2009 with English translation.
Japanese Office Action dated Jan. 8, 2010 with English translation for corresponding Japanese Application No. 2004-533844.
Japanese Office Action dated Apr. 23, 2010 in counterpart Japanese Application No. 2004-533844.
Japanese Decision dated May 14, 2010 in counterpart Japanese Application No. 2004-533860, with English translation.
Japanese Office Action dated Nov. 9, 2010 in counterpart Japanese Application No. 2004-533846.
International Search Report, dated Dec. 23, 2003.
United States Office Action dated May 29, 2008.
United States Office Action dated Jun. 2, 2008.
Japanese Office Action dated May 20, 2008.
European Office Action dated May 16, 2008.

* cited by examiner

FIG. 6

*Case 1*

```
PlayListMark(){
    length
    number_of_PlayList_marks
    for(i=0; j<number_of_PlayList_marks;j++){
        - - - - -
        mark_type
        - - - - -
        mark_time_stamp

- - - - - ref_to_still_image_index duration
        makers_information
        maker_name
        }
}
```

FIG. 7A

*Case 2*

```
PlayListMark(){
    length
    number_of_PlayList_marks
    for(i=0; j<number_of_PlayList_marks;j++){
        - - - - -
        mark_type
        - - - - -
        mark_time_stamp

- - - - - ref_to_still_image_index duration
        makers_information
        maker_name
        if (mark_type==0x10){
            number_of_still_images
            display_timing_mode
            display_order_mode
            display_effect_mode
            display_effect_period
        }
    }
}
```

FIG. 7B

*Movie & Still Mark*

```
PlayListMark(){
    length
    number_of_PlayList_marks
    for(i=0; j<number_of_PlayList_marks;j++){
        mark_type
        - - - - -
        mark_time_stamp

- - - - - ref_to_still_image_index duration
        makers_information
        maker_name
        if (mark_type==0x10){
            number_of_still_images
            display_timing_mode
            display_order_mode
            display_effect_mode
            display_effect_period
        }
        if (mark_type == 0x11){
            VPU_Clip_file_name
            VPU_start_TM
            VPU_end_TM
            VPU_data_size
            VPU_info
        }
    }
}
```

FIG. 7C

*Movie Mark*

```
PlayListMark(){
    length
    number_of_PlayList_marks
    for(i=0; j<number_of_PlayList_marks;j++){
        - - - - -
        mark_type
        - - - - -
        mark_time_stamp
        - - - - -
        duration
        makers_information
        maker_name
        }
        if (mark_type == 0x11){
            VPU_Clip_file_name
            VPU_start_TM
            VPU_end_TM
            VPU_data_size
            VPU_info
        }
    }
}
```

FIG. 11A

```
PlayItem(){
    length
    Clip_Information_file_name
    Clip_codec_identifier
    if (CPI_type = 1)
        ref_to_STC_id
            ⋮
    IN_time
    Out_time
            ⋮
    }
    if (<Still-Image>) {
        number_of_still_images
        for (i=0; i<number_of_still_images; i++){
            duration
            display_timing_mode
            display_order_mode
            display_effect_mode
            display_effect_period
        }
    }
}
```

FIG. 11B

```
PlayItem(){
    length
    Clip_Information_file_name
    Clip_codec_identifier
    if (CPI_type = 1)
        ref_to_STC_id
            ⋮ if (VPU) {
        VPU duration
        VPU_Clip_file_name
        VPU_start_PTM
        VPU_end_PTM
        VPU_info

}
}
```

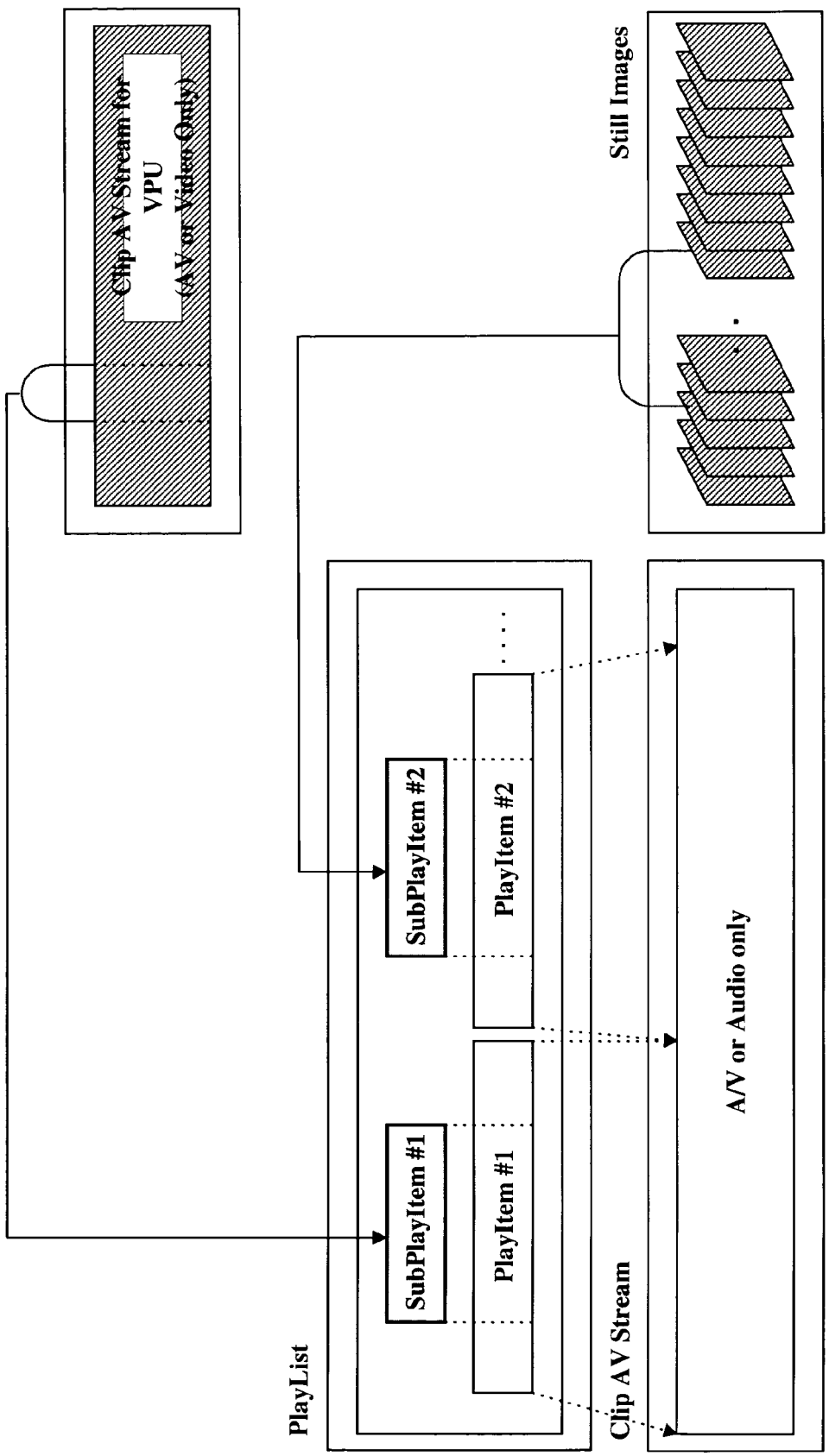

FIG. 13A

```
SubPlayItem(){
    length
    Clip_Information_file_name
    Clip_codec_identifier
    SubPlayItem_type
    ref_to_STC_id
    SubPlayItem_IN_time
    SubPlayItem_Out_time
    sync_PlayItem_id
    Sync_start_PTS_of_PlayItem
    if (<Still-Image>) {
        number_of_still_images
        for (i=0; i<number_of_still_images; i++){
            duration
            display_timing_mode
            display_order_mode
            display_effect_mode
            display_effect_period
        }
    }
}
```

FIG. 13B

```
SubPlayItem(){
    length
    Clip_Information_file_name
    Clip_codec_identifier
    SubPlayItem_type
    ref_to_STC_id
    SubPlayItem_IN_time
    SubPlayItem_Out_time
    sync_PlayItem_id
    Sync_start_PTS_of_PlayItem
    if (<Still-Image>) {
        number_of_still_images
        for (i=0; j<number_of_still_images; j++){
            duration
            display_timing_mode
            display_order_mode
            display_effect_mode
            display_effect_period
        }
    }
    if (<VPU>) {
        VPU_data_size
        VPU_info
    }
}
```

Sychronized Slideshow
( Random/Shuffle Display Mode : B )

Browsable Slideshow
(Sequential Display Mode)

RECORDING MEDIUM HAVING DATA STRUCTURE OF PLAYLIST MARKS FOR MANAGING REPRODUCTION OF STILL IMAGES RECORDED THEREON AND RECORDING AND REPRODUCING METHODS AND APPARATUSES

FOREIGN PRIORITY

The present invention claims priority under 35 U.S.C. 119 on Korean Application No. 2002-53608 filed Sep. 5, 2002, Korean Application No. 2002-56235 filed Sep. 16, 2002, and Korean Application No. 2002-056923 filed Sep. 18, 2002; the contents of each above-cited Korean application are incorporated by reference in their entirety.

BACKGROUND OF THE INVENTION

1. Field of the Invention

The present invention relates to a recording medium having a data structure for managing reproduction of at least still images recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) and Blu-ray Disk ROM (BD-ROM) are examples of these new optical disks.

The standardization for high-density read-only optical disks such as the Blu-ray ROM (BD-ROM) is still under way. An effective data structure for managing reproduction of still images recorded on the high-density read-only optical disk such as a BD-ROM is not yet available.

SUMMARY OF THE INVENTION

The recording medium according to the present invention includes a data structure for managing reproduction of still images recorded on the recording medium.

In one exemplary embodiment, a navigation area of the recording medium includes a plurality of marks. At least a portion of the marks are associated with still images, and each mark associated with a still image serves as a pointer to the still image to provide for skipping between still images during reproduction. For example, a data area of the recording medium may store at least first and second still images, and a playlist area of the recording medium may store at least one playlist. The playlist includes mark information, and the mark information provides a first mark providing presentation information on the first image and a second mark providing presentation information on the second image.

The present invention further provides apparatuses and methods for recording and reproducing the data structure according to the present invention, and recording and reproducing slideshows according to the present invention.

BRIEF DESCRIPTION OF THE DRAWINGS

The above features and other advantages of the present invention will be more clearly understood from the following detailed description taken in conjunction with the accompanying drawings, in which:

FIG. 6 illustrates one exemplary embodiment of the navigation information for still images provided by associated playlist marks;

FIGS. 7A-7C illustrate other exemplary embodiments of the navigation information for still images and/or VPUs provided by associated playlist marks;

FIGS. 11A and 11B each illustrate an exemplary embodiment of the playitem information field according to the present invention;

FIG. 12B illustrates another exemplary embodiment of a method for managing still images and VPUs according to the present invention;

FIGS. 13A and 13B each illustrate an exemplary embodiment of the sub-playitem information field according to the present invention;

DESCRIPTION OF THE PREFERRED EMBODIMENTS

In order that the invention may be fully understood, exemplary embodiments thereof will now be described with reference to the accompanying drawings.

Figure 1:
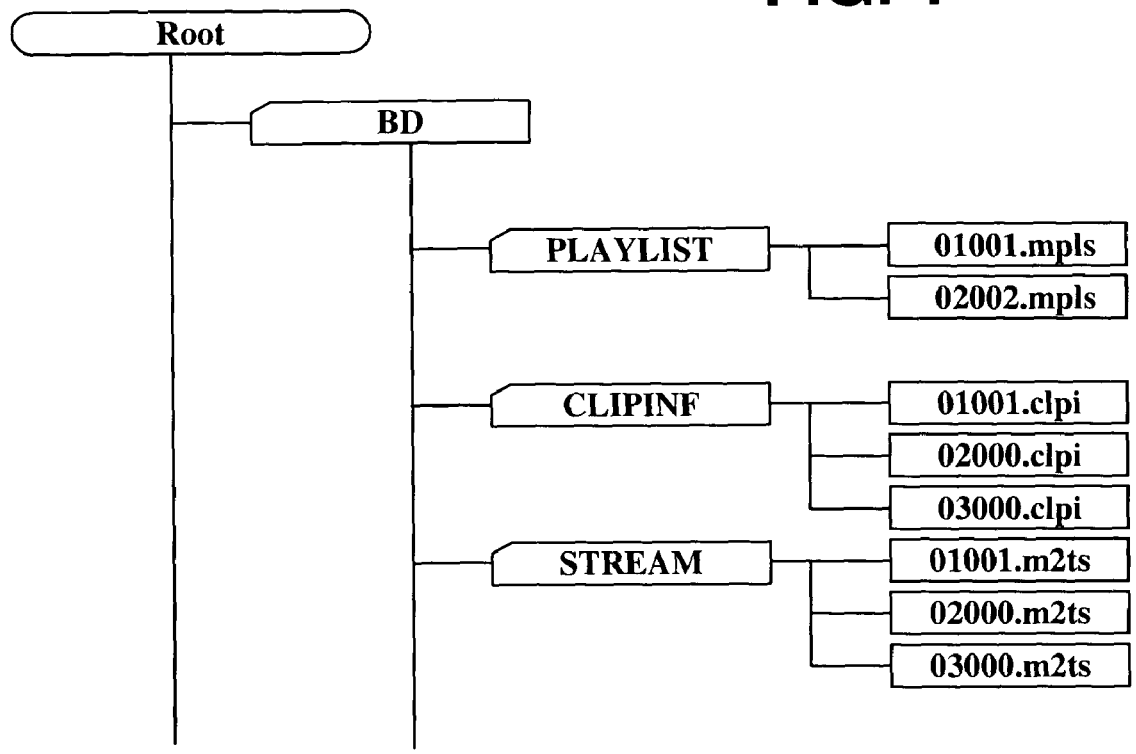
FIG. 1 illustrates an exemplary embodiment of a recording medium file or data structure according to the present invention.

A high-density optical disk, for example, a Blu-Ray ROM (BD-ROM), BD-RE, etc. in accordance with the invention may have a file or data structure for managing reproduction of video and audio data as shown in FIG. 1. Some aspects of the data structure according to the present invention shown in FIG. 1 are the same as the well-known BD-RE standard, as such these aspects will not be described in great detail.

As shown in FIG. 1, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips or clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

The general information files (not shown) provide general information for managing the reproduction of the A/V streams recorded on the optical disk.

Figure 2:
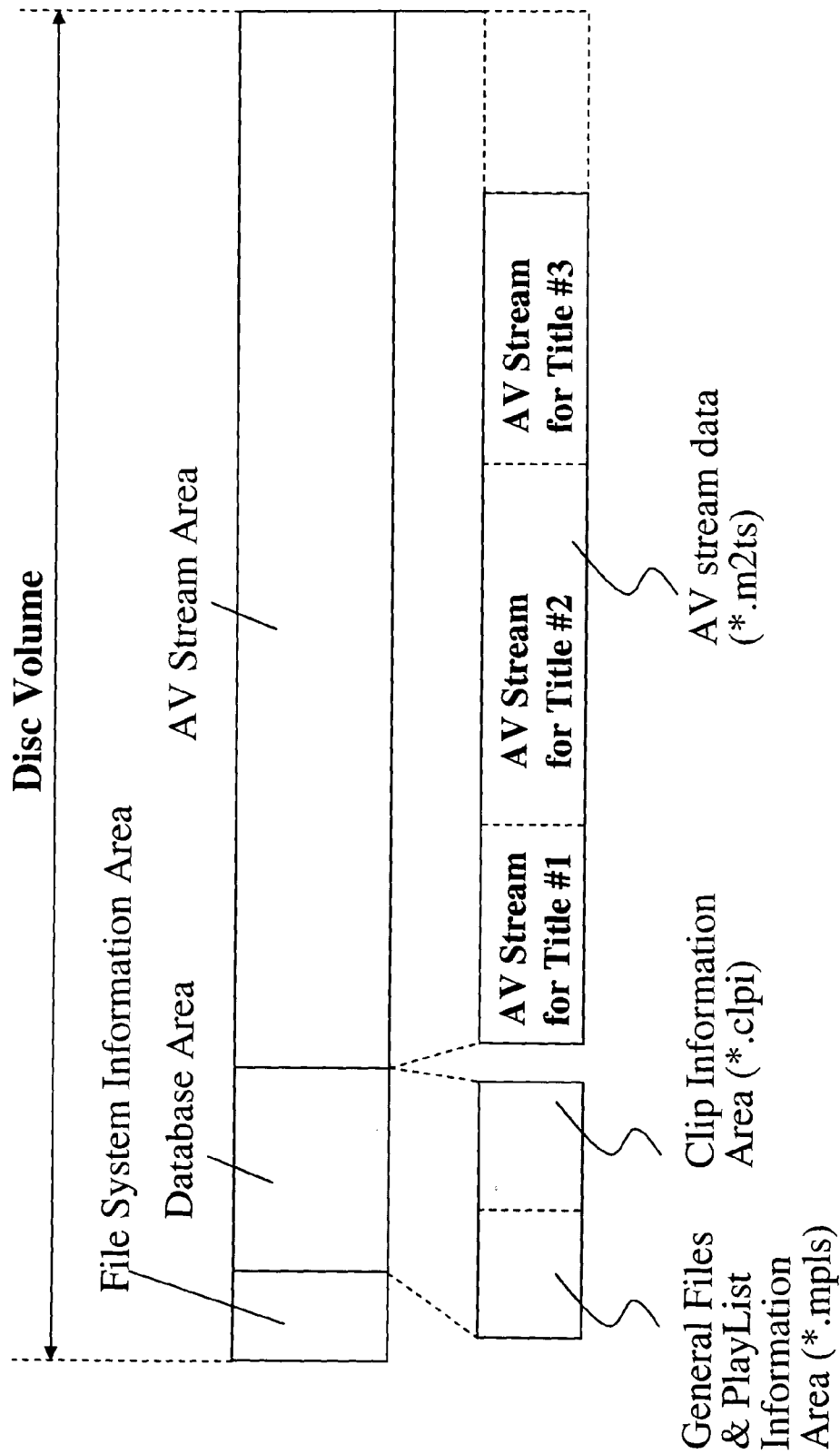
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images may be recorded and reproduced in an organized and/or user interactive fashion, for example, as slideshows. The data structure for managing reproduction of still images for a high-density optical disk in accordance with embodiments of the present invention will be described along with methods and apparatuses according to embodiments of the present invention for recording and reproducing still images.

Figure 3:
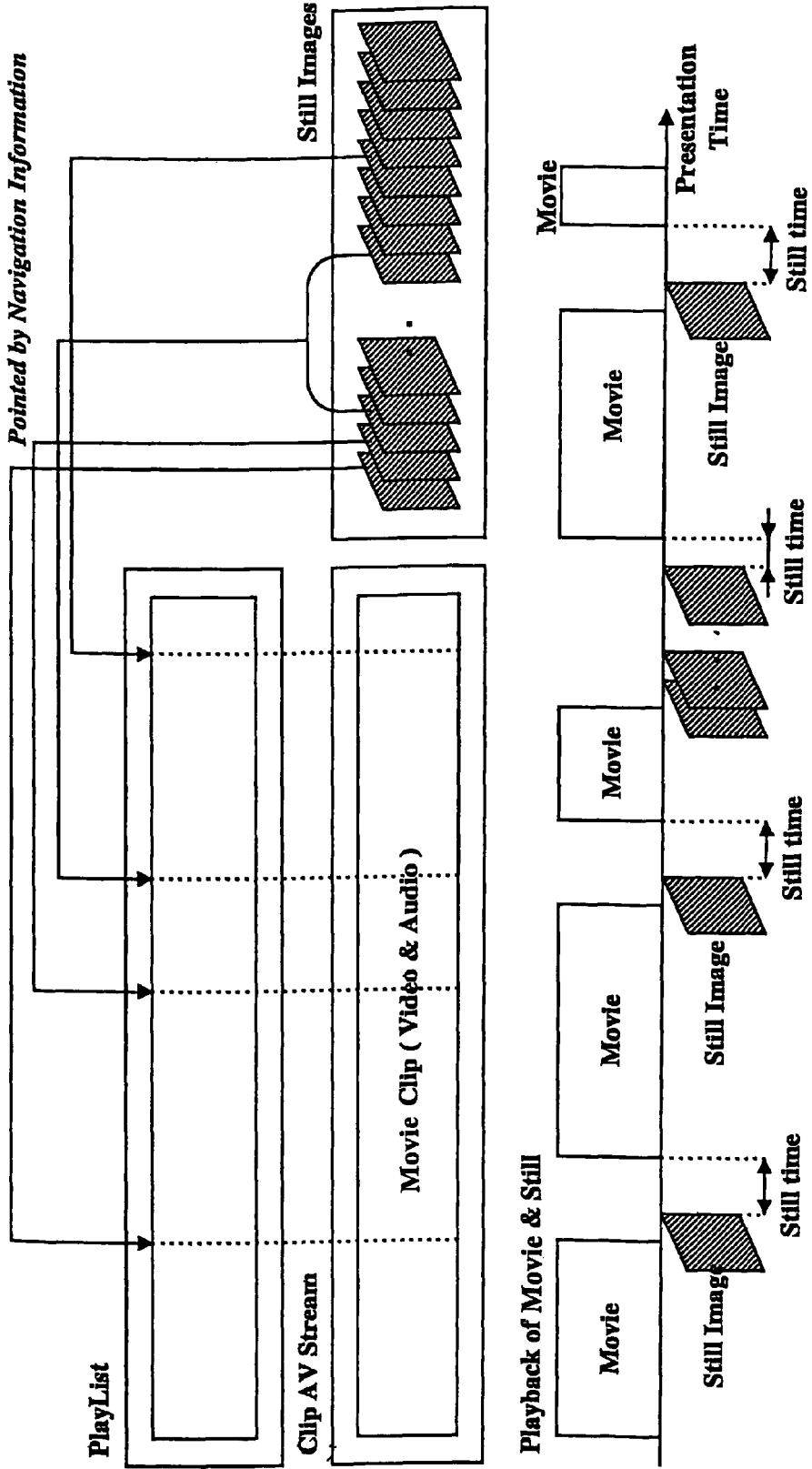
FIG. 3 illustrates a method of managing still images for a high-density optical disk in accordance with one embodiment of the invention.

FIG. 3 illustrates a method of managing still images for a high-density optical disk in accordance with one embodiment of the invention. In this embodiment, a plurality of still images are recorded as a still image file on a BD-ROM and the plurality of still images stored in the still image file are linked to specific navigation information of a playlist including navigation information for playback control of still images. The specific navigation information linked to the still images is linked to specific movie video data contained in a clip A/V stream storing movie video and audio data.

As depicted in FIG. 3, a plurality of still images can be linked to one recording position. The plurality of still images can be displayed in various ways, for example, by a sequential, a random/shuffle, or an automatic/manual slideshow. The various display options will be described in greater detail below.

Figure 4:
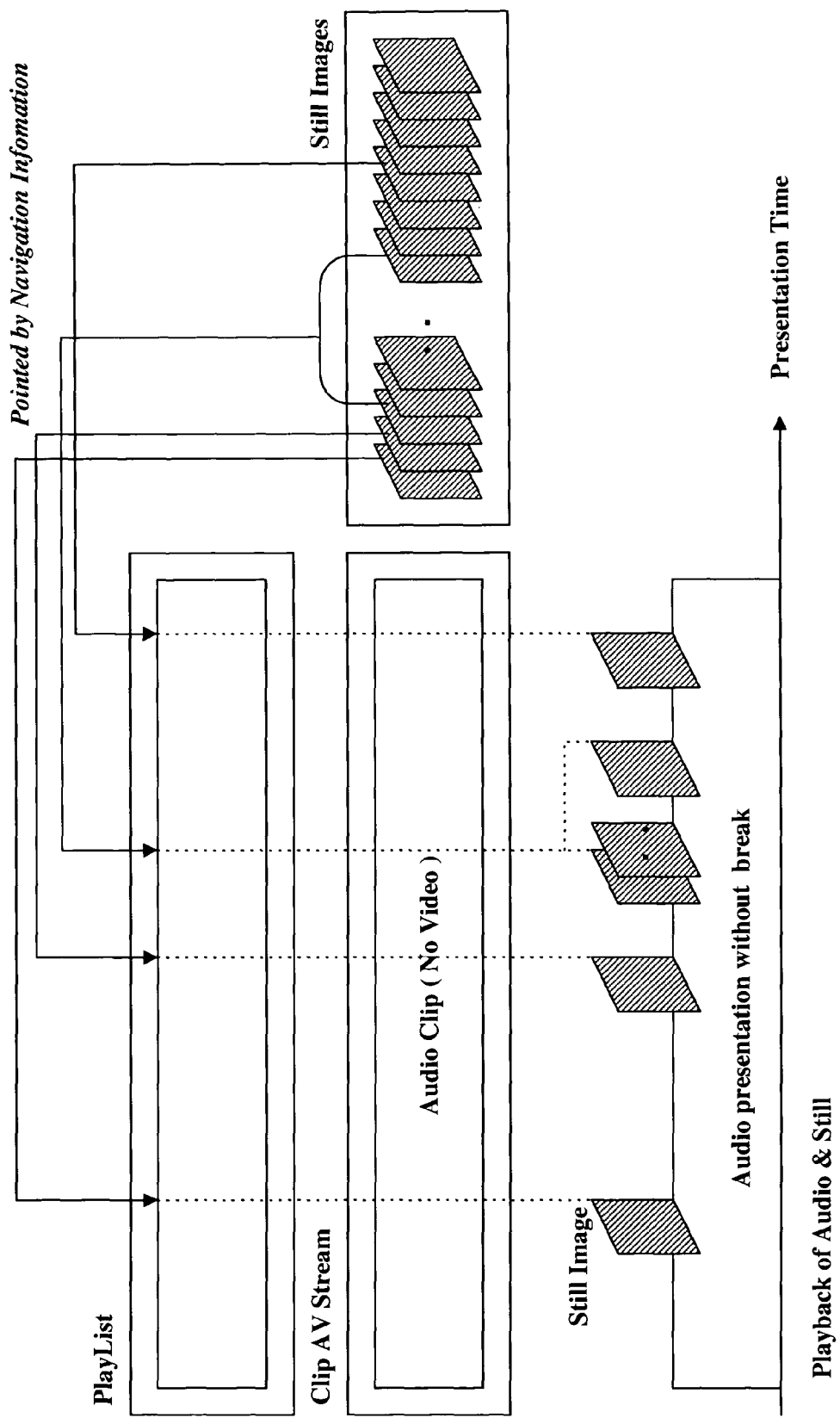
FIG. 4 illustrates a method of managing still images for a high-density optical disk in accordance with another exemplary embodiment of the invention.

FIG. 4 illustrates a method of managing still images for a high-density optical disk in accordance with another exemplary embodiment of the invention. This embodiment is the same as the embodiment of FIG. 3 except the clip A/V stream only contains audio data. In this case, while playing the audio data, the optical disk reproducing apparatus detects still images linked to specific recording positions of the audio data and performs a still operation that outputs the detected still images together with the audio data.

According to the embodiments of the present invention, movie data (e.g., video or video and audio) and still images or audio data and still images may be provided to a user through, for example, a television set connected to an optical disk reproducing apparatus such as discussed in detail below. Methods of managing navigation information for linking still images to the movie or audio data will now be described in detail.

Figure 5A:
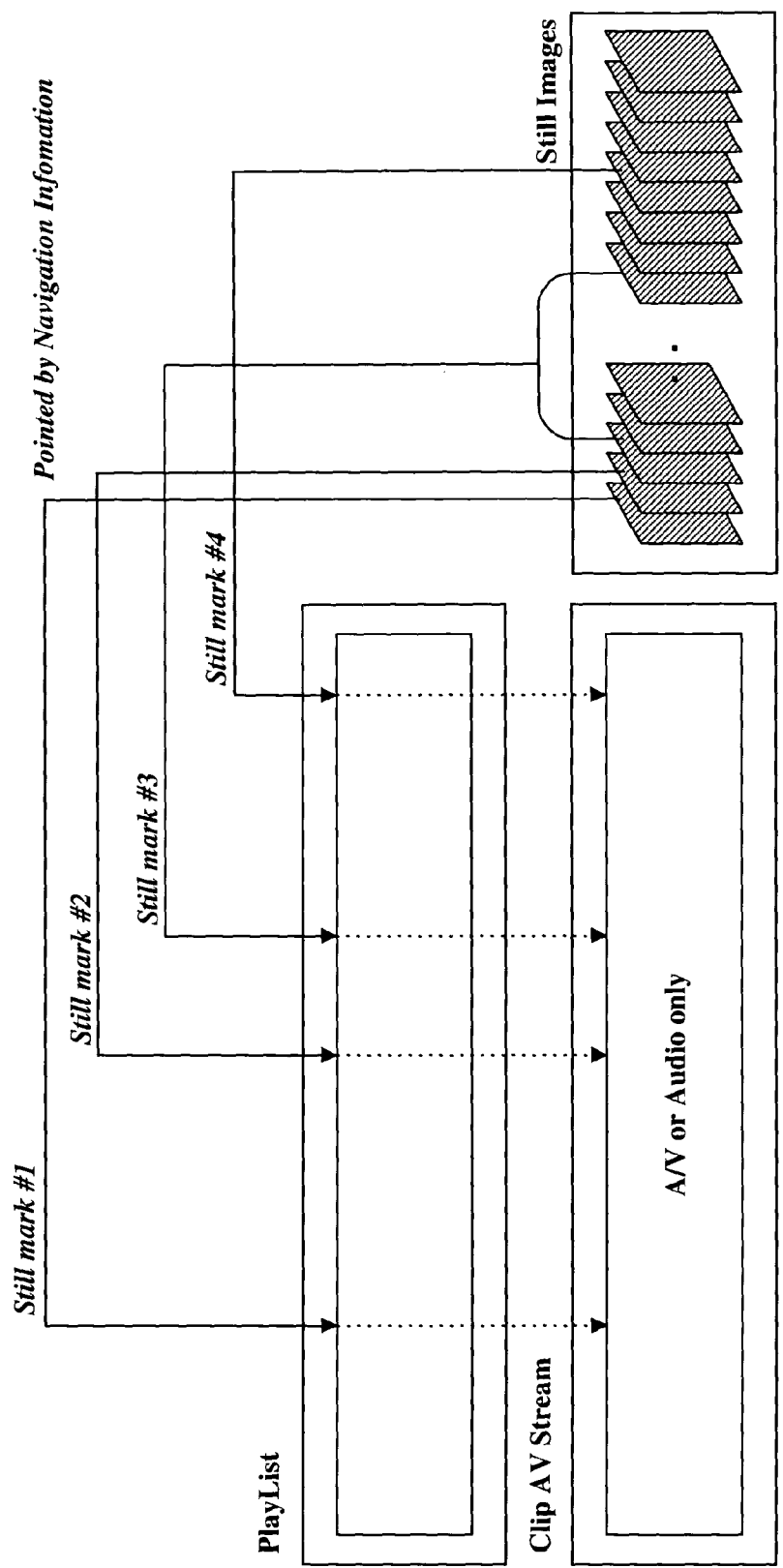
FIG. 5A illustrates one exemplary method of managing still images in accordance with an exemplary embodiment of the invention.

FIG. 5A illustrates one exemplary method of managing still images in accordance with an exemplary embodiment of the invention. In this embodiment, one or more playlist marks are defined for managing still images. As shown in FIG. 5A, a still image or a group of still images is linked to a playlist by a playlist mark, referred to as a still mark. In this manner, the still images may be managed as a slideshow as described in more detail below. The playlist marks are described in greater detail below with respect to FIGS. 6-7.

FIG. 6 illustrates one exemplary embodiment of the navigation information for still images provided by associated playlist marks. A playlist file includes a playlist mark information field called 'PlayList Mark'. As shown in FIG. 6, the playlist mark 'PlayListsMark' information field indicates a length of the information field and a number of the playlist marks 'number_of_PlayList_marks' in the playlist. In case of the BD-RE, the 'length' field has a value of '26 bytes'. In case of the BD-ROM in accordance with the invention the length field may have a value greater than 26 bytes. For each playlist mark, the playlist mark 'PlayListsMark' information field indicates the mark type 'mark_type', a time stamp 'mark_time_stamp', duration 'duration', maker's information 'makers_information', and maker's name 'maker_name'.

The mark type indicates the type of mark. For example, when a mark indicates the beginning of a chapter, the mark type 'mark_type' identifies the associated mark as a chapter mark. As further shown in FIG. 6, if a mark is of the still type, then an index number of the associated still image or images recorded on the BD-ROM 'ref_to_still_image_index' is provided.

The time stamp 'mark_time_stamp' of the mark indicates a point where the mark is placed; namely, indicates a point on a time axis of the A/V stream of clips (e.g., ATC and/or STC basis) where the mark is placed. The 'duration' indicates the length of the mark that starts from the time stamp indicated by the 'mark_time_stamp'. If the mark is a still mark, then the duration 'duration' may indicate a length of time to display the still image.

The maker's information 'maker_information' provides information supplied by the maker, and the maker's name 'maker_name' gives the maker's name.

As demonstrated from the description of FIG. 6, when a mark is a still mark, the information associated with the still mark provides navigation information for reproducing the still image associated with the still mark.

FIG. 7A illustrates another exemplary embodiment of the navigation information for still images provided by associated playlist marks. As shown, this embodiment is the same as the embodiment of FIG. 6 except that if the mark is a still mark (e.g., mark type=0x10) then additional information regarding the reproduction of the still image or images is provided in association with the still mark. Specifically, the following indicator fields are provided: an indicator of the number of still images associated with the still mark 'number_of_still_images', an indicator of the display timing 'display_timing_mode', an indicator of the display order 'display_order_mode', an indicator of the display effect 'display_effect_mode' and an indicator of the period for the display effect 'display_effect_period'.

If the 'display_timing_mode' field is '0', it indicates an automatic slide show. If the 'display_timing_mode' field is '1', it indicates a browsable still or slideshow operation, which displays still images based on key input by a user. If the 'display_order_mode' field is '0', it indicates a sequential still operation in which the still images are to be displayed sequentially. If the 'display_order_mode' field is '1', it indicates a random still operation in which the still images are to be displayed in a random manner.

The 'display_effect_mode' indicates the effect to be applied to the still image such as cut-in/cut-out or fade-in/fade-out. The 'display_effect_period' field indicates the time duration for which the corresponding display effect is valid. The fields of 'display_timing_mode', 'display_order_mode', 'display_effect_mode' and 'display_effect_period' can be defined and managed for each still image.

In the case where a plurality of still images are linked, the 'ref_to_still_index' field indicative of the index number of a still image is defined as the index number of the last still image or the number of linked still images. If only one still image is linked, the 'ref_to_still_index' is defined to be '0xFFFF'.

As a further alternative, the embodiment of FIG. 7A may provided without including the 'ref_to_still_index' field.

Figure 5B:
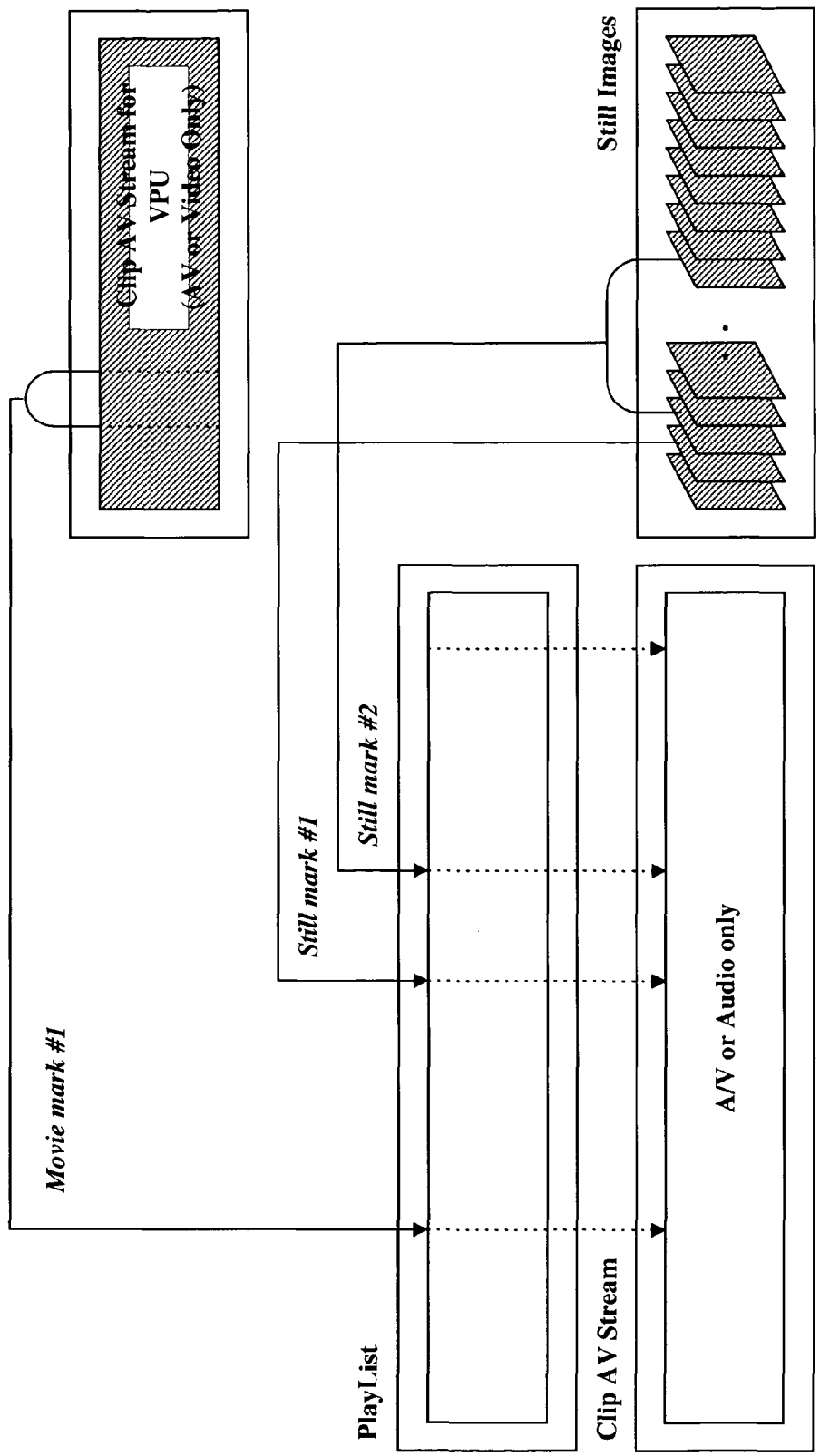
FIG. 5B illustrates one exemplary method of managing still images and video presentation units (VPUs) in accordance with an exemplary embodiment of the invention.

FIG. 5B illustrates a method of managing still images in accordance with an exemplary embodiment of the invention that is the same as FIG. 5A, except that playlist marks may also be defined as movie marks. Movie marks are used for management of video presentation units (VPUs). A prescribed recording block of a clip of an A/V stream wherein both video and audio data are recorded or only video data are recorded is assigned as a video presentation unit (VPU). A VPU can be recorded and managed as a separate file. Navigation information may be recorded and managed so as to display a still image or video of a VPU at a particular position where display of a slideshow is desired, for example, such as in the middle of displaying motion video.

FIG. 7B illustrates an exemplary embodiment of the navigation information for still images and VPUs provided by associated playlist marks. This embodiment is the same as FIG. 7A, except that if the mark is a movie mark (e.g., mark type=0x11) then additional information regarding the reproduction of a VPU is provided in association with the movie mark. Specifically, the following indicator fields are provided: 'VPU_Clip_file_name' to provide the clip file name of the VPU, the 'VPU_start_TM' and 'VPU_end_TM' information to select and play the specified recording block of the VPU, 'VPU_data_size' information to indicate of the data record size of the VPU, and 'VPU_info' to provide information about the attributes of video data recorded in the VPU.

FIG. 7C illustrates another example embodiment of the playlist mark information field. As shown, this embodiment is the same as the embodiment of FIG. 7B except the navigation information for still images is not included.

Figure 8A:
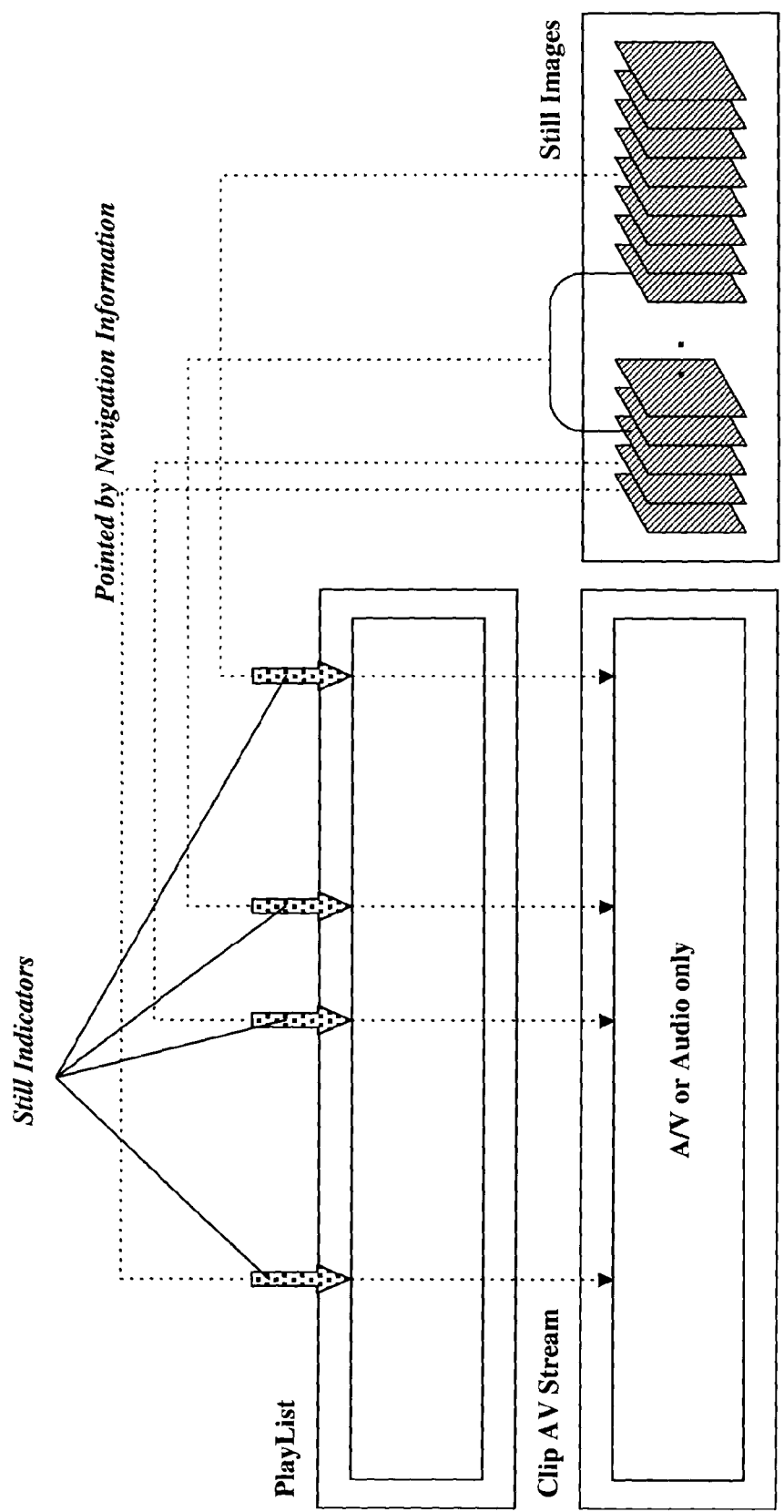
FIG. 8A illustrates another exemplary embodiment of a method of managing still images according to the present invention.

FIG. 8A illustrates another exemplary embodiment of a method of managing still images according to the present invention. In this embodiment, navigation information such as the display time and display method of a still image or a group of still images are provided by one or more still indicators. As shown, a still indicator links one or a group of still images with a clip AV stream. The clip A/V stream may contain movie video and audio data together or only audio data. The still images may be stored in a single image file or each still image may be stored in an individual image file.

Figure 9A:
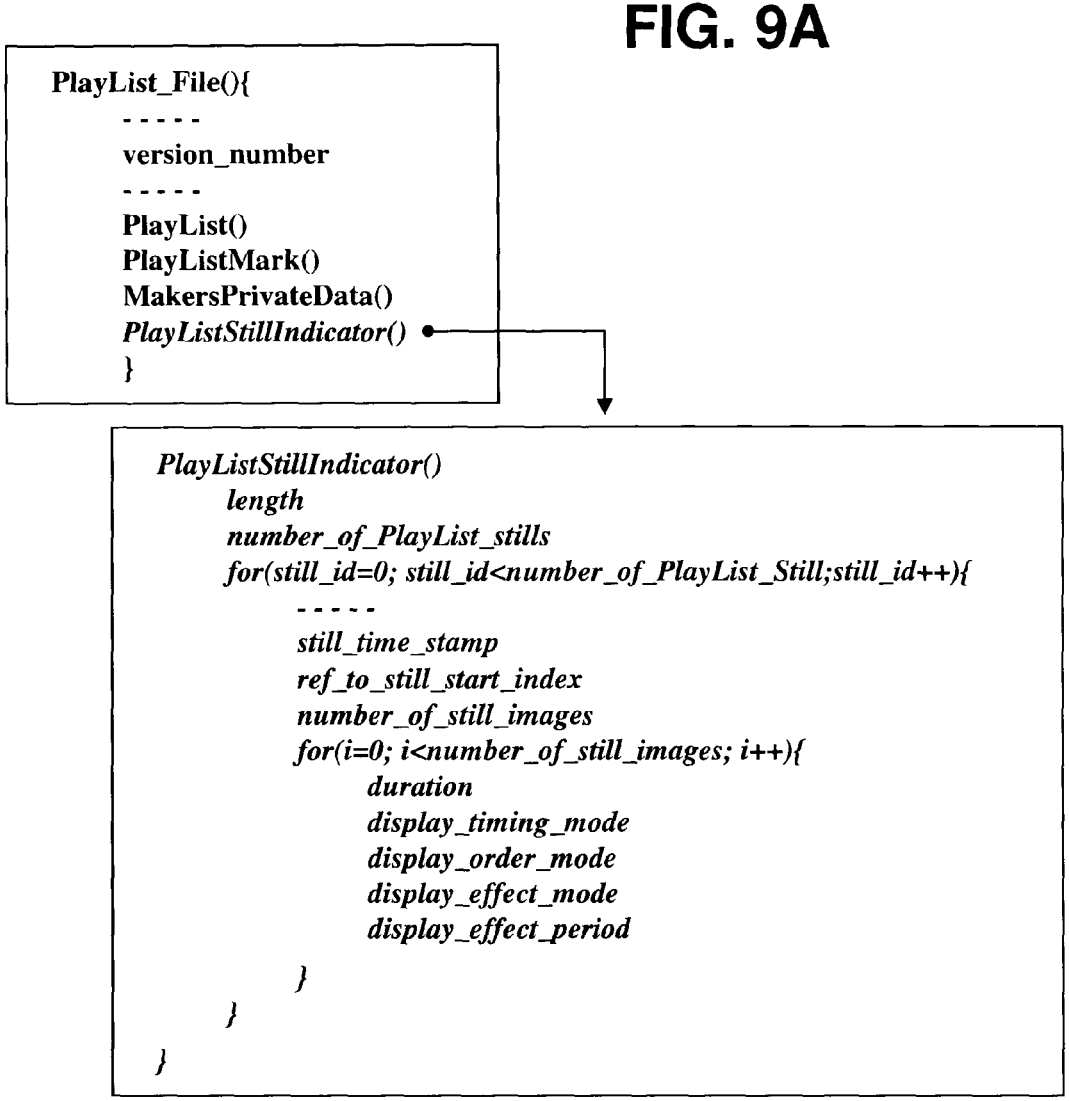
FIG. 9A illustrates an exemplary embodiment of the navigation information for still images provided by a still indicator information field.

As illustrated in FIG. 9A, the still indicator 'PlayListStillIndicator' is a new information field added to a playlist file 'PlayList_File'. This new information field indicates a length of the information field and a number of the playlist stills 'number_of_PlayList_stills'. For each playlist still, the playlist indicator 'PlayListStillIndicator' information field indicates a time stamp 'still_time_stamp', a start index number of the associated still image(s) recorded on the BD-ROM 'ref_to_still_start_index', and a number of still images 'number_of_still_images.'

The time stamp 'still_time_stamp' of the playlist still indicates a point where the playlist still is placed; namely, indicates a point on a time axis of the A/V stream of clips (e.g., ATC and/or STC basis) where the playlist still is placed.

Furthermore, as shown in FIG. 9A, for each still image associated with a playlist still, the following information is provided: a duration 'duration' to display the still image, an indicator of the display timing 'display_timing_mode', an indicator of the display order 'display_order_mode', an indicator of the display effect 'display_effect_mode' and an indicator of the period for the display effect 'display_effect_period'. These indicators were defined above with respect to FIG. 7A.

Figure 8B:
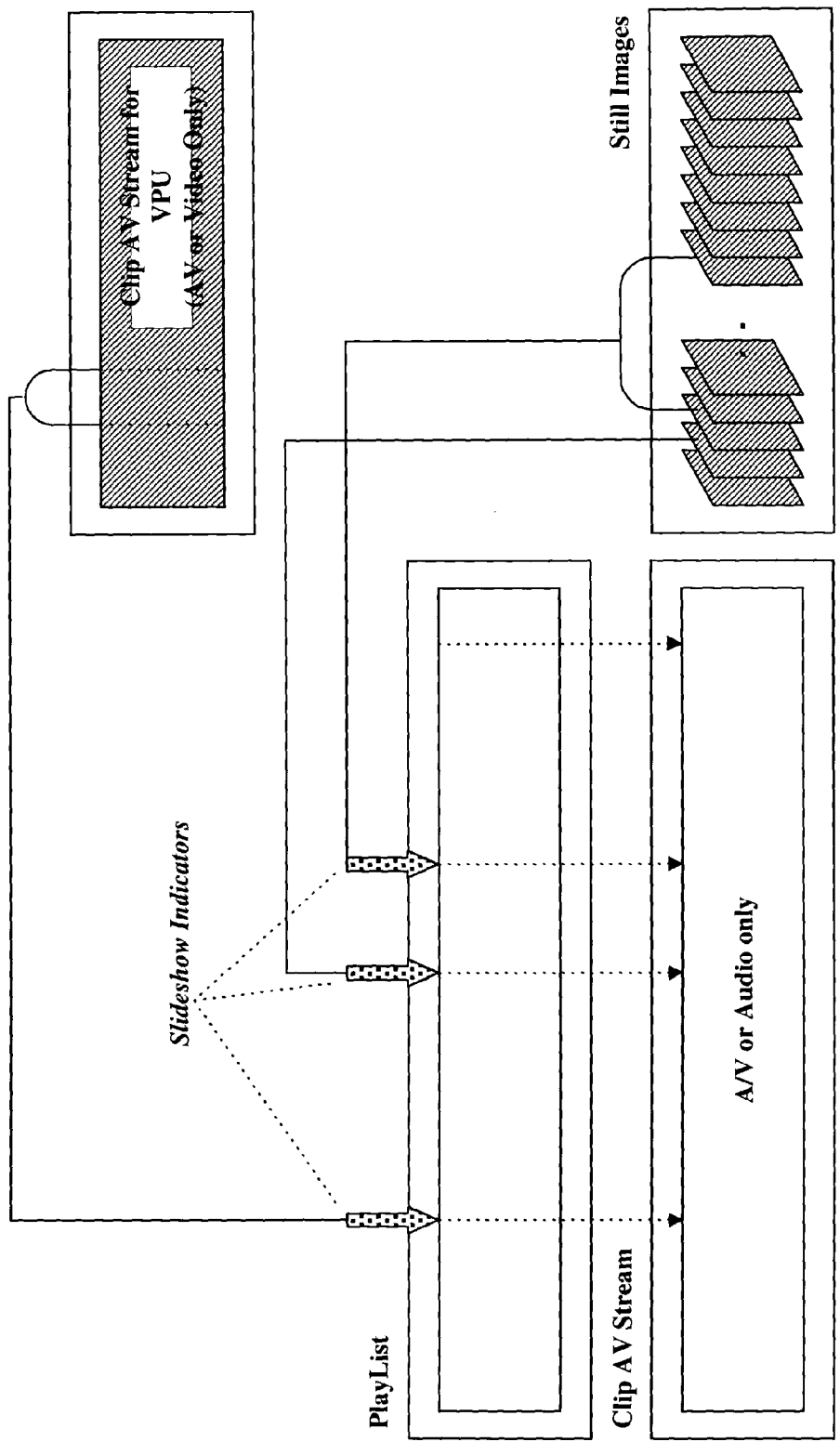
FIG. 8B illustrates another exemplary embodiment of a method of managing still images and VPUs according to the present invention.

FIG. 8B illustrates another exemplary embodiment of a method of managing still images and VPUs according to the present invention. In this embodiment, navigation information such as the display time and display method of a still image or a group of still images and/or VPUs are provided by one or more slideshow indicators. As shown, a slideshow indicator links one or a group of still images with a clip AV stream, or links a VPU with a clip AV stream. The clip A/V stream may contain movie video and audio data together or only audio data. The still images may be stored in a single image file or each still image may be stored in an individual image file.

Figure 9B:
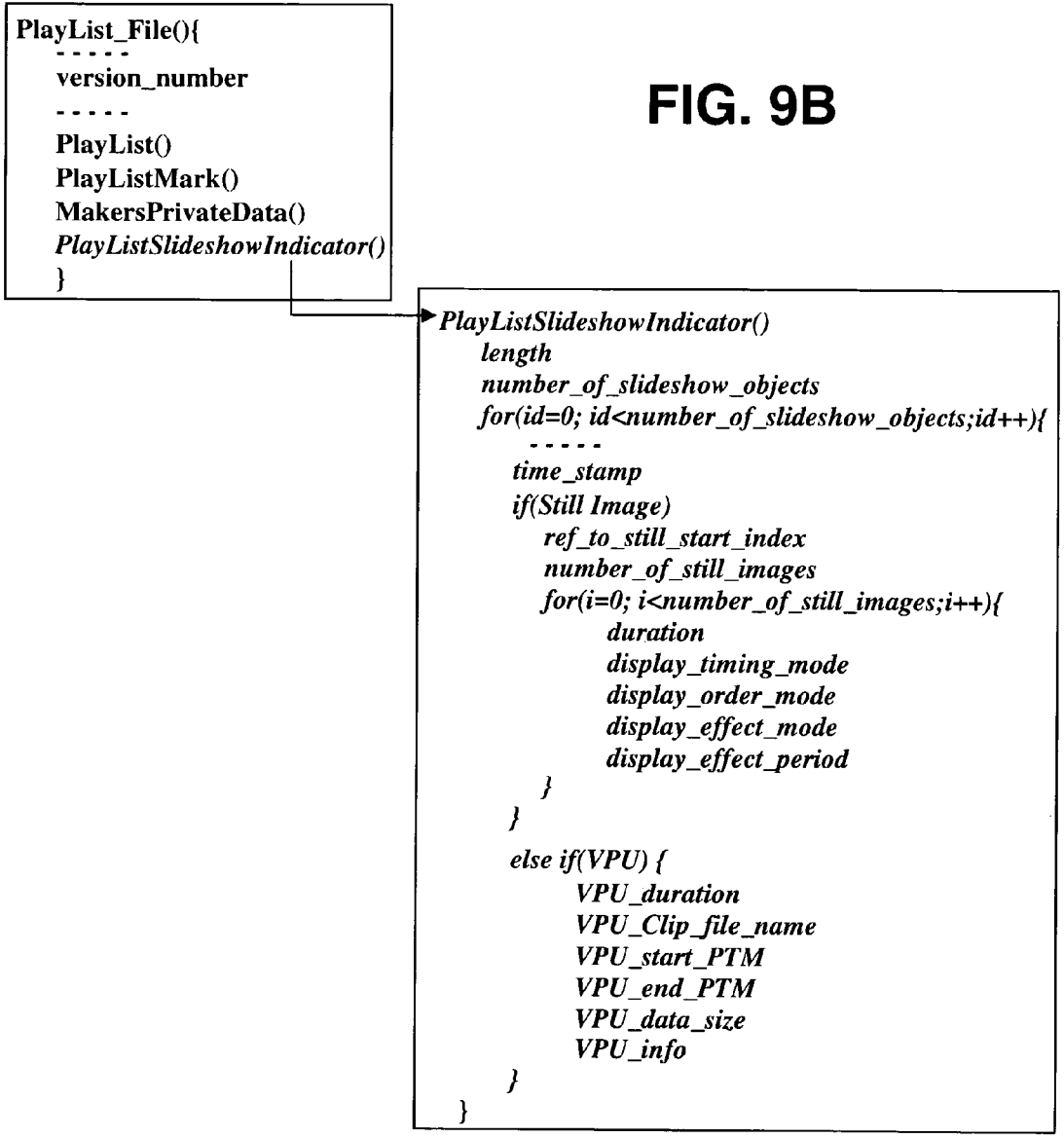
FIG. 9B illustrates an exemplary embodiment of the navigation information for still images and VPUs provided by a slideshow indicator information field.

As illustrated in FIG. 9B, the slideshow indicator 'PlayListSlideshowIndicator' is a new information field added to a playlist file 'PlayList_File'. This new information field indicates a length of the information field and a number of slideshow object 'number_of_slideshow_objects'. For each slideshow object, the slideshow indicator indicates a time stamp 'still_time_stamp'. The time stamp 'still_time_stamp' indicates a point where the slideshow object is placed; namely, indicates a point on a time axis of the A/V stream of clips (e.g., ATC and/or STC basis) where the slideshow object is placed.

If the slideshow object is a still image, a start index number of the associated still image(s) recorded on the BD-ROM 'ref_to_still_start_index', and a number of still images 'number_of_still_images' are provided. Furthermore, as shown in FIG. 9B, for each still image associated with a playlist still, the following information is provided: a duration 'duration' to display the still image, an indicator of the display timing 'display_timing_mode', an indicator of the display order 'display_order_mode', an indicator of the display effect 'display_effect_mode' and an indicator of the period for the display effect 'display_effect_period'. These indicators were defined above with respect to FIG. 7A.

If the slideshow object is a VPU, then the 'VPU_Clip_file_name' information to identify the clip file of said VPU, 'VPU_start_TM' and 'VPU_end_TM' information to select and play the specified recording block of the VPU, 'VPU_data_size' information about data record size of the VPU, and 'VPU_info' information about the attributes of video data recorded in the VPU are included and recorded.

Figure 10:
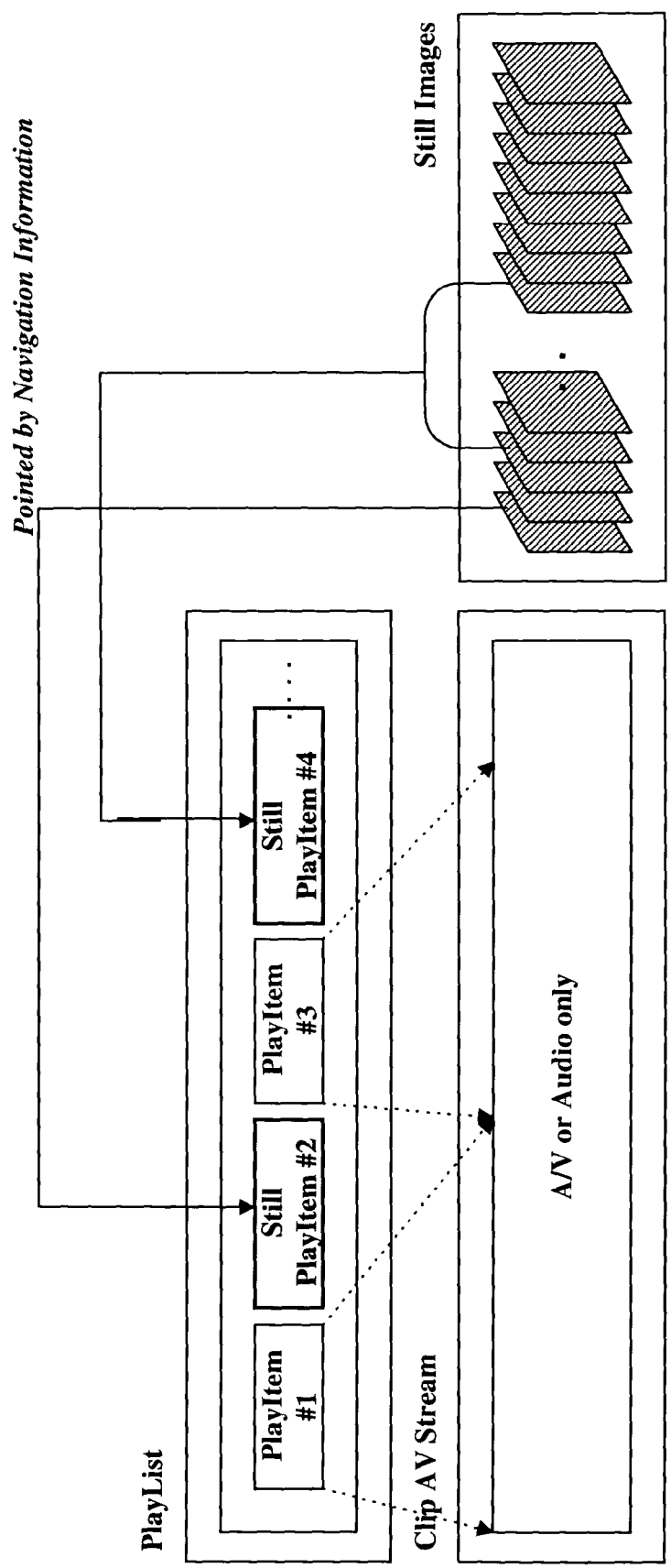
FIG. 10 illustrates another exemplary embodiment of a method for managing still images according to the present invention.

FIG. 10 illustrates another exemplary embodiment of a method for managing still images according to the present invention. In this embodiment, playitems are used to manage one or more still images. For example, as shown, some playitems manage movie video and audio data or only audio data and some playitems manage a still image, a group of still images or slideshow (or portion of a slideshow), and have been labeled still playitems.

The clip A/V stream corresponding to the playlist may contain movie video and audio data together or only audio data. The still images may be stored in a single image file or each still image may be stored in an individual image file. The playitems of the playlist provide navigation information linking the still images and the clip A/V stream. As will be appreciated, the still images and, for example, the audio data are recorded in separate files and managed by separate files. In this manner, the still images and audio data may be reproduced together but independently. This permits, for example, continuously loop through (i.e., repeating) the clip of audio data linked with still images forming a slideshow while the still images are presented.

FIG. 11A illustrates an exemplary embodiment of the playitem information field according to the present invention. The playitem 'PlayItem' information field indicates a length of the information field, and indicates the name of the clip information file 'Clip_Information_File_Name' associated with the playitem.

The playitem information field also includes an indicator 'Clip_codec-identifier' indicating whether the playitem is a still playitem and associated with one or more still images. For example, the 'Clip_codec_identifier' field may indicate the encoding format of a still image such as 'JPEG', which then serves to indicate that the playitem is a still playitem for still image display.

If the CPI type given in the clip information file associated with the playitem is an EP map type signified by CPI type=1, then the playitem includes an STC reference 'ref_to_STC-id' on the clip indicated by the clip information file name 'Clip-Information_file_name'.

The playitem also includes IN_time and OUT_time fields. The 'IN_time' field takes up 2 bytes and indicates the index number of the first still image among the linked still images stored in the still image file and the 'OUT-time' field indicates the index number of the last still image among the linked still images.

Furthermore, as shown in FIG. 11A, if the playitem is a still playitem, then the number of still images 'number_of_still_images' is provided; and for each still image, the following information is provided: a duration 'duration to display the still image, an indicator of the display timing 'display_timing_mode', an indicator of the display order 'display_order_mode', an indicator of the display effect 'display_effect_mode' and an indicator of the period for the display effect 'display_effect_period'. These indicators were defined above with respect to FIG. 7A.

As will be appreciated, even though not shown in FIG. 10, a playitem may also serve as a VPU playitem. FIG. 11B illustrates an exemplary embodiment of a VPU playitem. Here, the clip codec identifier identifies the playitem as a VPU playitem, and provides the same VPU information discussed above with respect to movie marks and VPU slideshow objects.

Figure 12A:
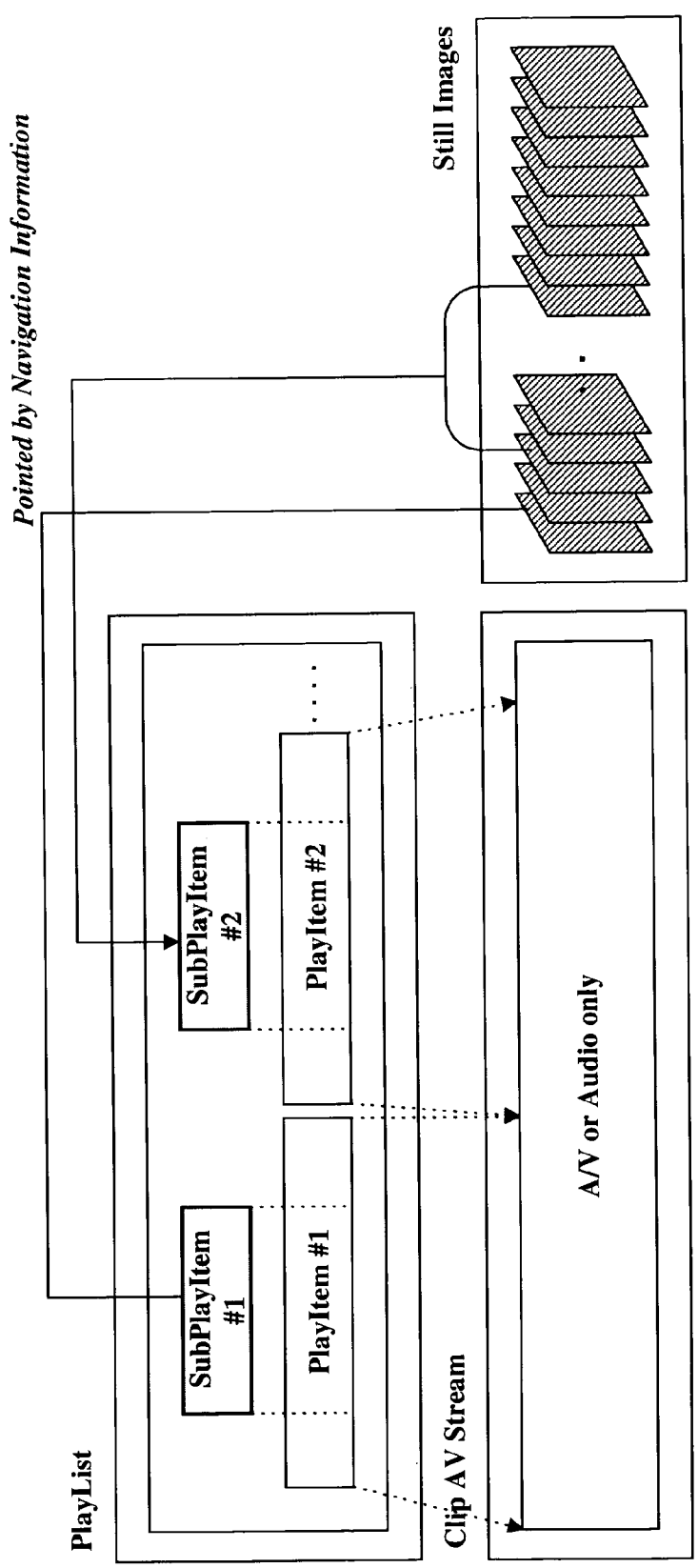
FIG. 12A illustrates another exemplary embodiment of a method for managing still images according to the present invention.

FIG. 12A illustrates another exemplary embodiment of a method for managing still images according to the present invention. In this embodiment, sub-playitems are used to manage one or more still images, while movie data (e.g., audio and video data) or only audio data is managed using playitems. The sub-playitem indicates a sub-path in a playlist.

In this method, a still image or a group of still images stored in a still image file is linked to a sub-playitem included in a playlist. The clip A/V stream corresponding to the playlist may contain movie video and audio data together or only audio data. The still images may be stored in a single image file or each still image may be stored in an individual image file. As will be appreciated, the still images and, for example, the audio data are recorded in separate files and managed by separate files. In this manner, the still images and audio data may be reproduced together but independently. This permits, for example, continuously loop through (i.e., repeating) the clip of audio data linked with still images forming a slideshow while the still images are presented.

FIG. 13A illustrates an exemplary embodiment of the sub-playitem information field according to the present invention. The sub-playitem 'SubPlayItem' information field indicates a length of the information field, and indicates the name of the clip information file 'Clip_Information_File_Name' associated with the sub-playitem.

The sub-playitem information field also includes an indicator 'Clip_codec-identifier' and a type indicator 'SubPlayItem_type' both indicating whether the playitem is a still playitem and associated with one or more still images. For example, the 'Clip_codec_identifier' field may indicate the encoding format of a still image such as 'JPEG', which then serves to indicate that the playitem is a still playitem for still image display. With respect to the type indicator 'SubPlayItem_type', if the type indicator 'SubPlayItem_type' equals, for example, "2", then this indicates the sub-playitem is associated with a sub-path for displaying one or more associated still images.

The sub-playitem also includes IN_time and OUT_time fields. The 'IN_time' field takes up 2 bytes and indicates the index number of the first still image among the linked still images stored in the still image file and the 'OUT-time' field indicates the index number of the last still image among the linked still images.

The sub-playitem further includes an STC reference 'ref_to_STC_id' for the clip indicated by the clip information file name 'Clip-Information_file_name', an id of the playitem containing this sub-playitem 'sync_Playitem_id', and an indication 'Sync_start_PTS_of PlayItem' of a presentation-time in the playitem indicated by the 'sync_Playitem_id.'

Furthermore, as shown in FIG. 13A, if the playitem is a still playitem, then the number of still images 'number_of_still_images' is provided; and for each still image, the following information is provided: a duration 'duration' to display the still image, an indicator of the display timing 'display_timing_mode', an indicator of the display order 'display_order_mode', an indicator of the display effect 'display_effect_mode' and an indicator of the period for the display effect 'display_effect_period'. These indicators were defined above with respect to FIG. 7A.

In an alternative embodiment, the movie video and audio data or only audio is managed by a sub-playitem and the still image, images or slideshow (or portion thereof) is managed by a playitem.

FIG. 12B illustrates an exemplary embodiment of the present invention that is the same as the embodiment of FIG. 12A, except that a sub-playitem may also serve as a VPU sub-playitem to manage reproduction of a VPU.

FIG. 13B illustrates an exemplary embodiment of a sub-playitem according to the embodiment of FIG. 12B. As shown the sub-playitem embodiment of FIG. 13B is the same as the embodiment of FIG. 12B, except that if the clip codec identifier and/or sub-playitem type indicator indicate the sub-playitem is a VPU sub-playitem, then the sub-playitem further indicates the size of the VPU and information about the attributes of video data recorded in the VPU. For example, with respect to the type indicator 'SubPlayItem_type', if the type indicator 'SubPlayItem_type' equals, for example, "3", then this indicates the sub-playitem is associated with a sub-path for displaying a VPU.

Figure 14A:
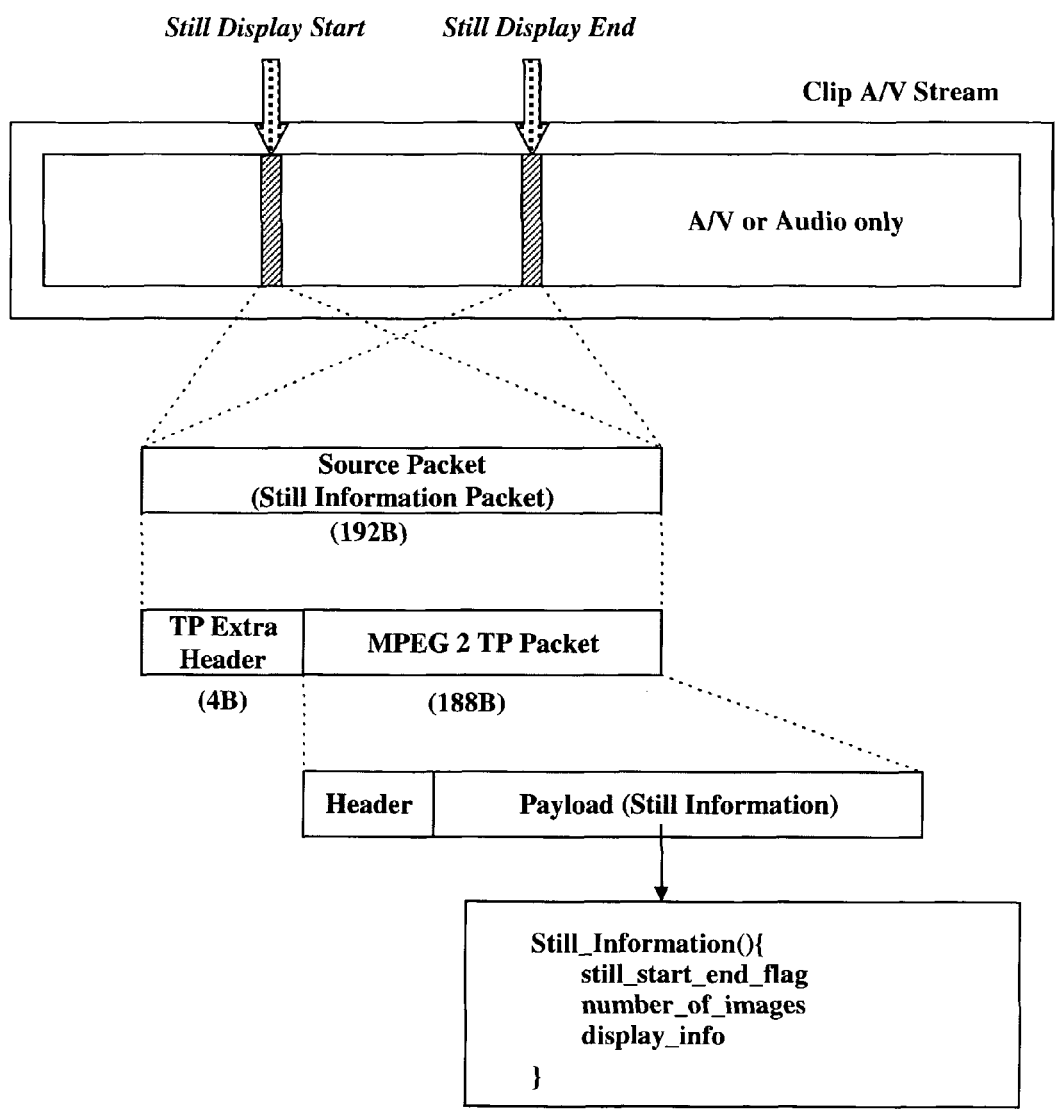
FIG. 14A illustrates a method of recording still information packets for identifying still display positions in accordance with an exemplary embodiment the invention.

Next, embodiments of a method for recording still information packets for allowing detection of still display positions will be described in detail. FIG. 14A illustrates a method of recording still information packets for identifying still image display positions in accordance with one embodiment the present invention. In this method, source packets recorded at still display start and still display end positions contained in the clip A/V stream, which is pointed to by at least one type of navigation information among still marks, still indicators, still playitems, and sub-playitems, are defined as still information packets for identifying groups of still images.

A still information packet comprises a 4-byte TP (transport packet) extra header and a 188-byte MPEG2 TP (transport packet). The MPEG2 TP further comprises a packet header and a payload. As depicted in FIG. 14A, the still information including fields of 'still_start_end_flag', 'number_of_images', and 'display_info' recorded in the payload.

For example, if the 'still_start_end_flag' field is '0', it indicates the still display start position. If this field is '1', it indicates the still display end position. The 'number_of_images' field is only meaningful at the display start position and 'display_info' field stores the display order, the display effect, and the display effect period, etc.

Figure 16:
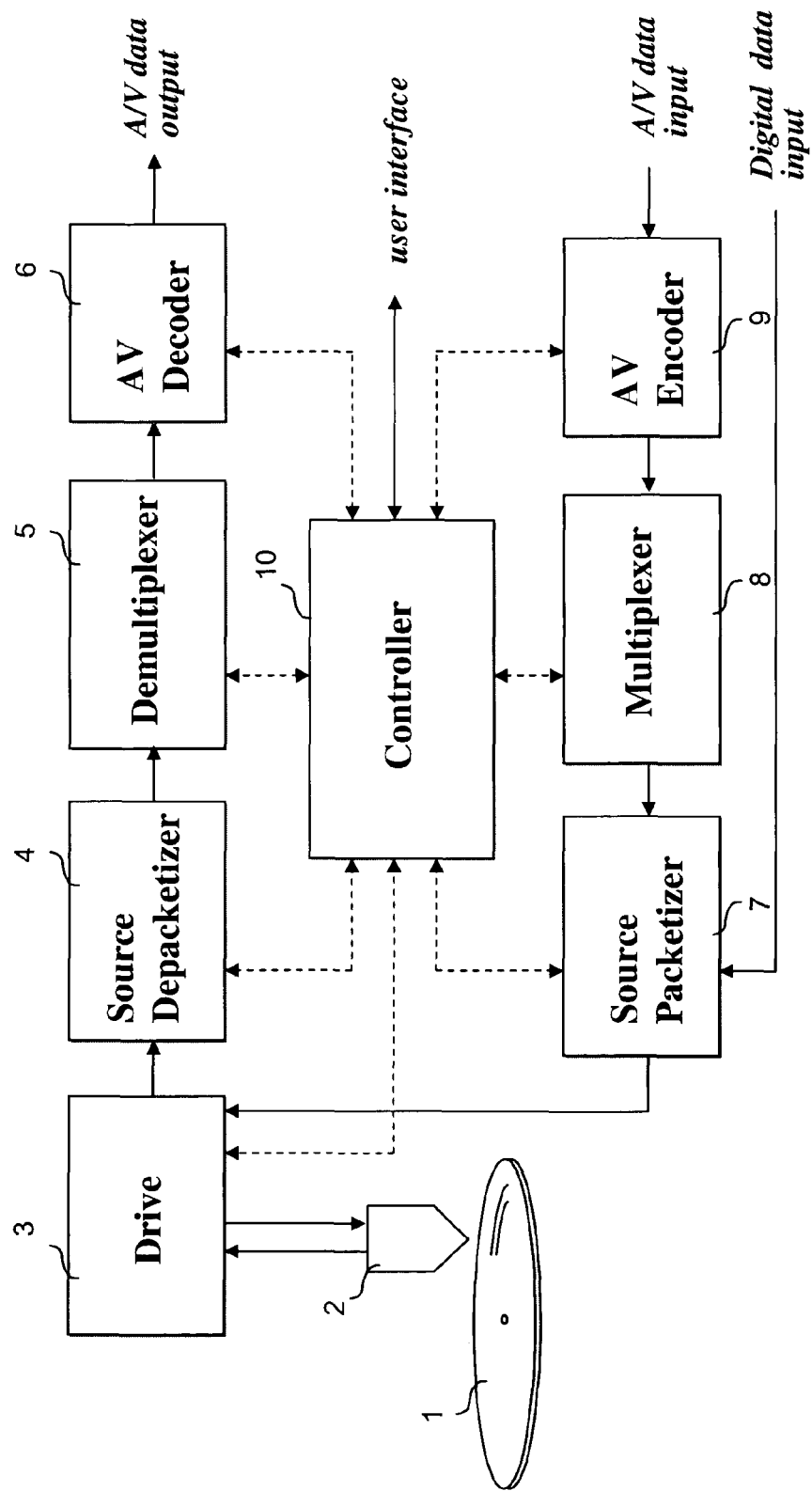
FIG. 16 illustrates a schematic diagram of an embodiment of an optical disk recording and reproduction apparatus of the present invention.

If the decoding operation in a VDP system such as shown in FIG. 16 detects a source packet having still information, that is, a still information packet while playing movie video and/or audio data recorded in the clip A/V stream, the optical disk reproducing apparatus displays the still image after stopping playing of the movie video data or displays the still image with playing audio data.

Referring to the 'still_start_end_flag', the VDP system starts or stops display of the still image. Two different types of packets, a still start packet and a still end packet, may be recorded at the still display start and end positions, respectively.

Figure 14B:
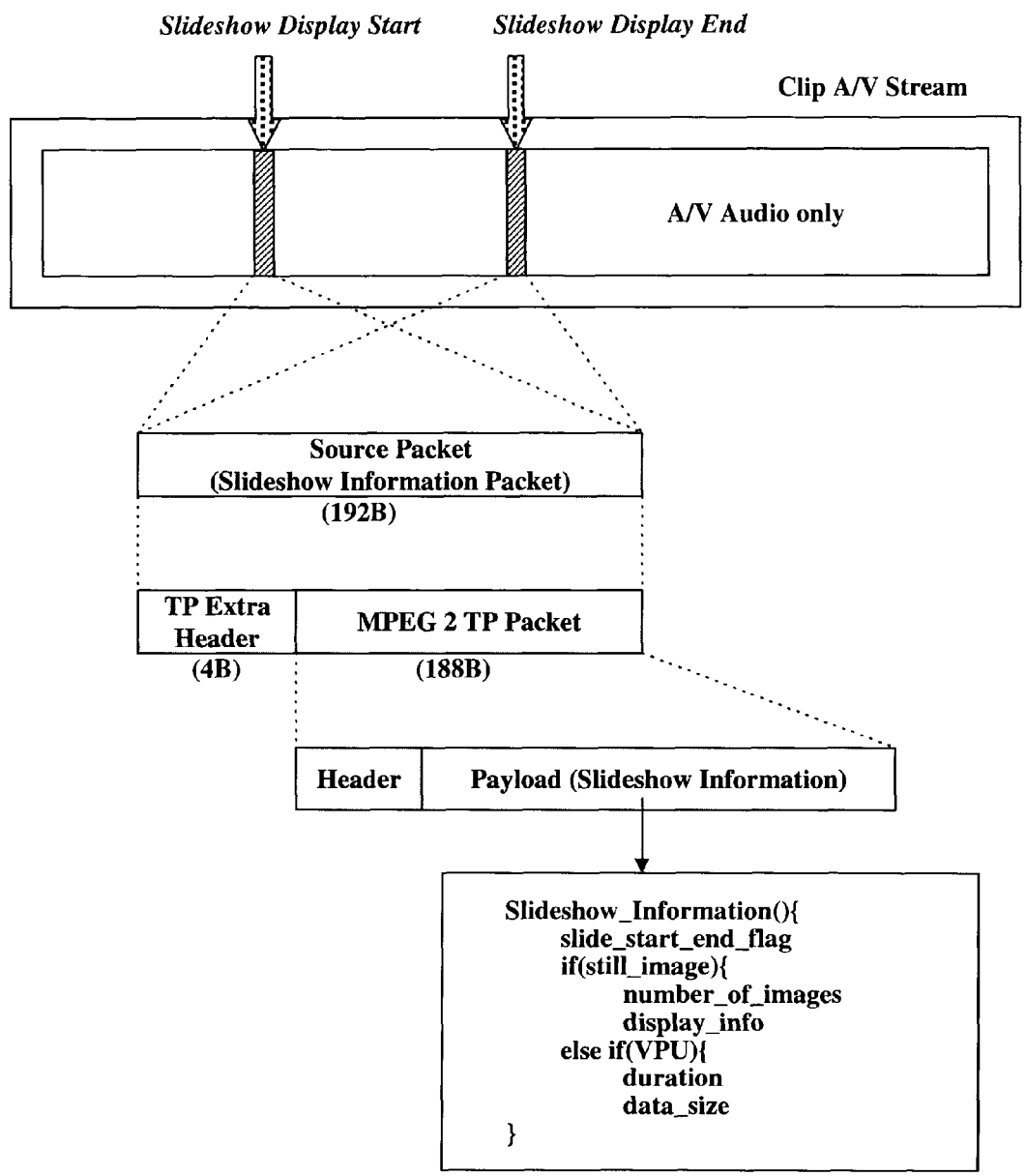
FIG. 14B illustrates a method of recording slideshow information packets for identifying display positions in accordance with an exemplary embodiment the invention.

FIG. 14B illustrates a method of recording slideshow information packets for identifying slideshow display positions in accordance with one embodiment the present invention. In this method, source packets recorded at slideshow display start and slideshow display end positions contained in the clip A/V stream, which is pointed to by at least one type of navigation information among playlist marks, still indicators, slideshow indicators, playitems, and sub-playitems, are defined as slideshow information packets for identifying groups of still images.

A slideshow information packet comprises a 4-byte TP (transport packet) extra header and a 188-byte MPEG2 TP (transport packet). The MPEG2 TP further comprises a packet header and a payload. As depicted in FIG. 14B, the slideshow information include the field of 'slideshow_start_end_flag', the fields of 'number_of_images', and 'display_ info' if the slideshow information packet is a still image information packet, and the fields of duration of the VPU and data size of the VPU if the slideshow information packet is a VPU information packet.

If the decoding operation in a VDP system such as shown in FIG. 16 detects a source packet having slideshow information, that is, a slideshow information packet while playing movie video and/or audio data recorded in the clip A/V stream, the optical disk reproducing apparatus displays the still image or VPU after stopping playing of the movie video data or displays the still image with playing audio data.

Referring to the 'still_start_end_flag', the VDP system starts or stops display of the still image. Two different types of packets, a still start packet and a still end packet, may be recorded at the still display start and end positions, respectively.

Figure 15:
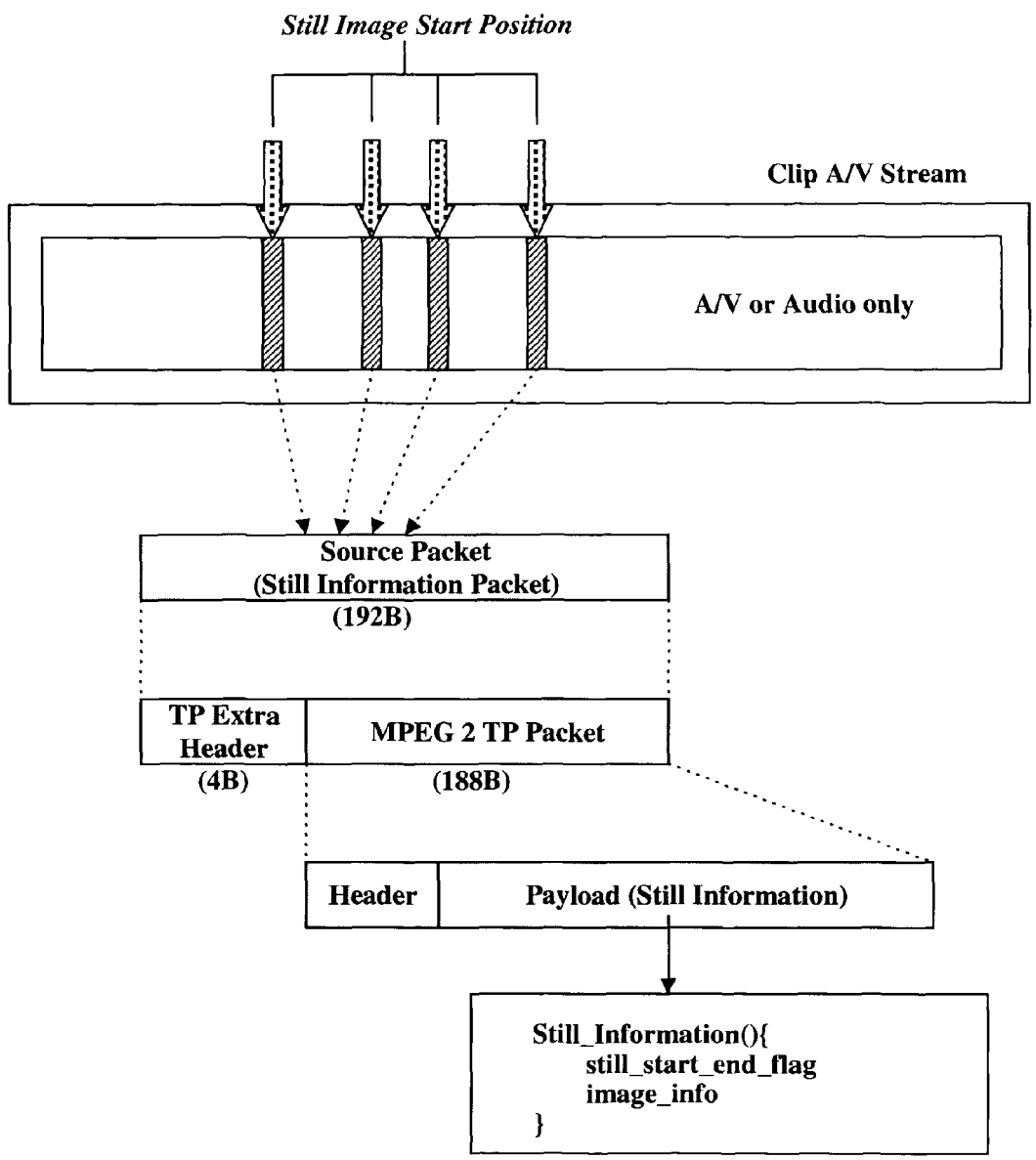
FIG. 15 illustrates a method of recording still information packets for identifying still display positions in accordance with another exemplary embodiment the invention.

FIG. 15 illustrates a method of recording still information packets for identifying still image display positions in accordance with another embodiment of the invention. In this method, still information packets are added to display positions of all the still images contained in the clip A/V stream, which is pointed to by the navigation information employing at least one type among still marks, still indicators, still playitems, or sub-playitems. In this embodiment, still images can be detected by the still information packets.

As described above, the still information packet contains still information including the fields of 'still_start_end_flag' and 'display_info'. The 'display_info' field includes the display order, the display effect, and the display effect period, etc.

If the decoding operation in a VDP system such as shown in FIG. 16 detects a source packet having the still information, that is, a still information packet while playing movie video and/or audio data recorded in the clip A/V stream, the optical disk reproducing apparatus displays the still image after stopping playing of the movie video data or displays the still image with playing audio data.

The still information packet may be added to both the still image start and end positions. Referring to the 'still_start_end_flag', the VDP system starts or stops display of the still image. Two different types of packets, a still start packet and a still end packet, may be recorded at the still display start and end positions, respectively.

An optical disk reproducing apparatus outputs movie data and still images or audio data and still images to, for example, a connected television set by referring to navigation information according to the present invention such as still marks, still indicators, slideshow indicators, still playitems, and sub-playitems. FIG. 16 illustrates a schematic diagram of an embodiment of an optical disk recording and reproducing apparatus according to the present invention. As shown, an AV encoder 9 receives and encodes data (e.g., movie video and audio data, only audio data, and/or still image data). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 14, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 1-15 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, a still image or still images may be reproduced in association with movie video and audio data or only audio data based on the navigation information. Furthermore, an image or group of images may be reproduced as a slideshow or portion of a slideshow. As also discussed, a slideshow may be synchronized, browsable, etc.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 16 has been described as a recording and reproducing apparatus, it will be understood that only a recording or only a reproducing apparatus may be provided using those portions of FIG. 16 providing the recording or reproducing function.

Next, some of the different types of slideshows will be described in detail with reference to FIGS. 17-20. It will be appreciated that these are merely examples, and the data structure of the present invention provides for other types of slideshows.

Figure 17:
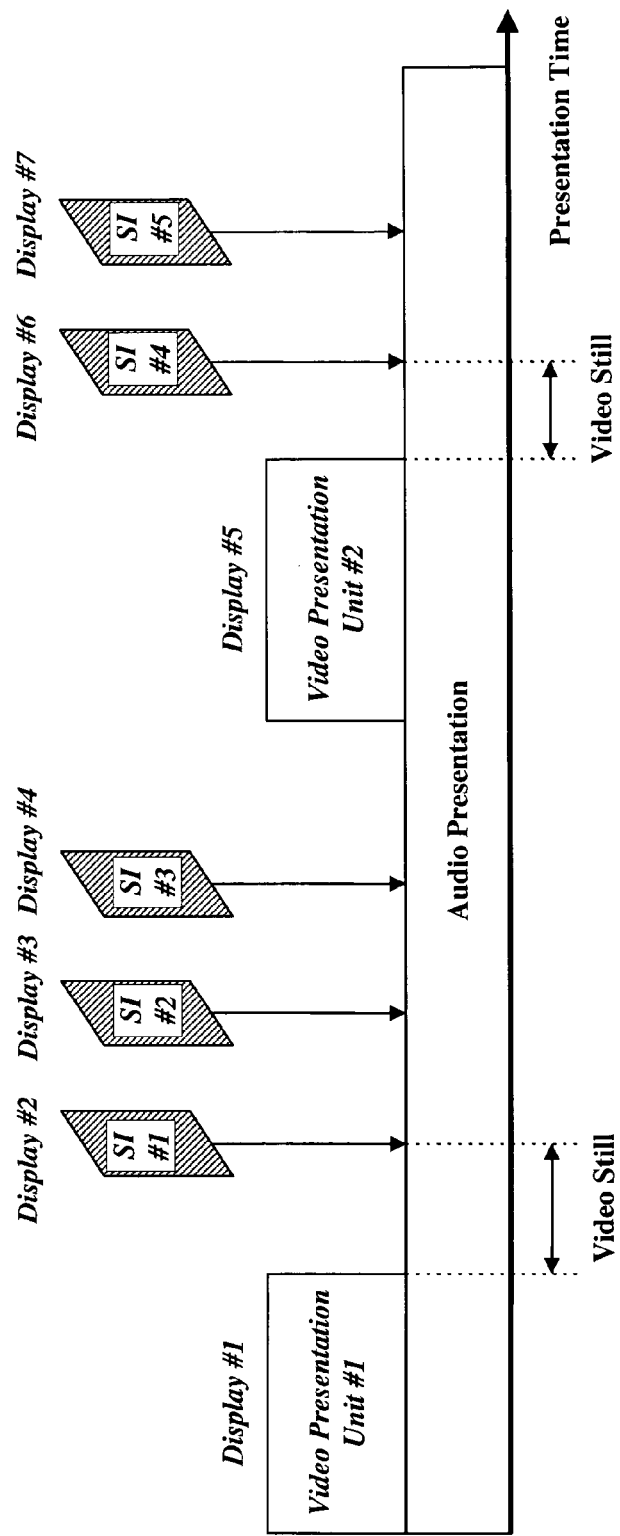
FIGS. 17-19 illustrate examples of synchronized or time-based slideshows.
Figure 18:
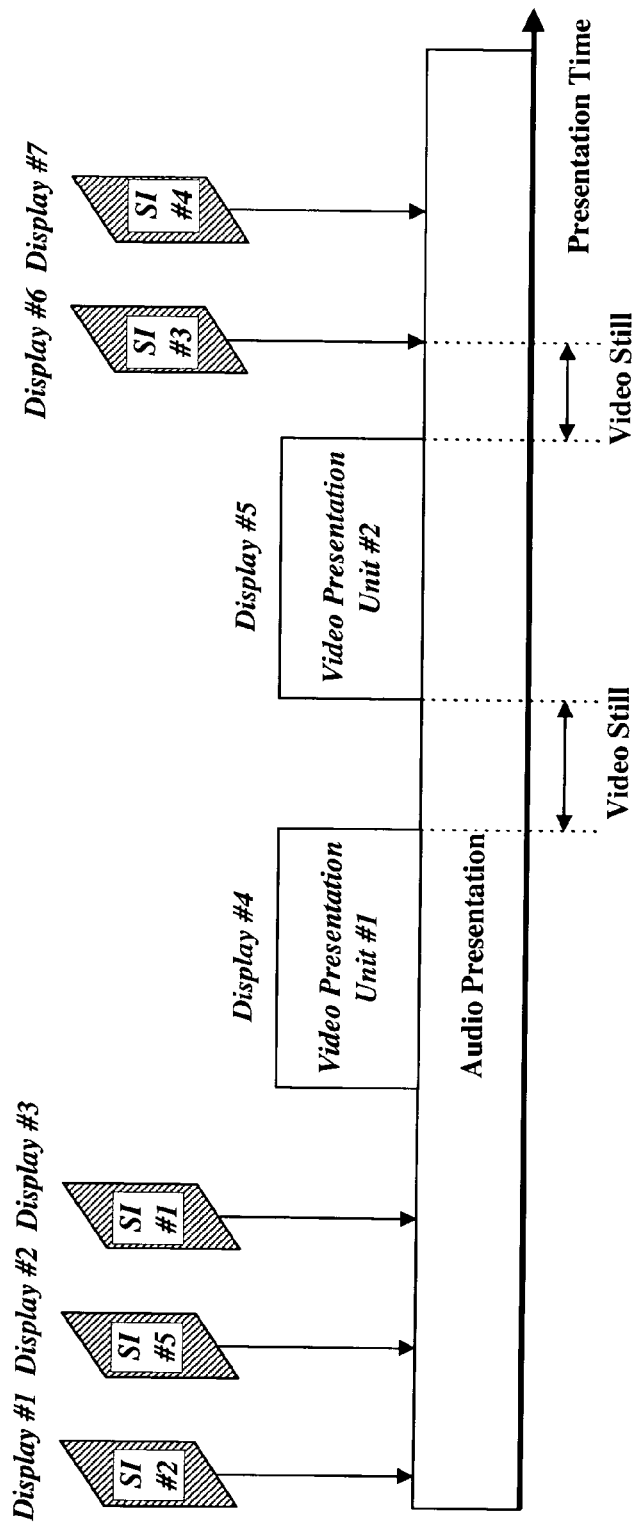
Figure 19:
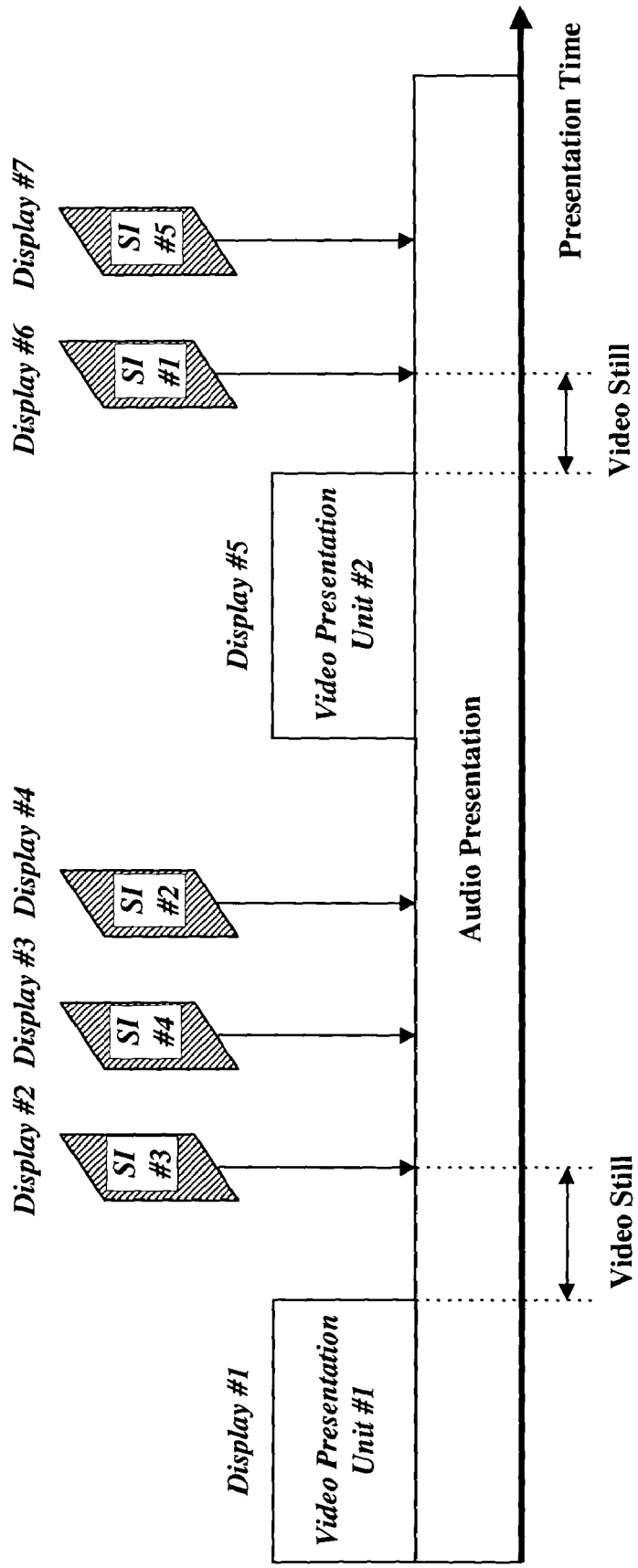

FIGS. 17-19 illustrate examples of synchronized or time-based slideshows. In this example, the display items (VPUs and/or still items) are displayed at a particular point in time. In the examples of FIGS. 17-19, the display items are displayed at particular points in time in synchronization with the audio data reproduced from a clip A/V stream. The presentation time and duration of each display item are provided by the navigation information in a playlist. For example, the navigation information includes one or more of a playlist mark, still or slideshow indicator, playitem and sub-playitem as described in detail above. The navigation information for the audio data is supplied by one of a playitem and sub-playitem in the playlist. The navigation information may further indicate whether a sequential or random playback should occur.

FIG. 17 illustrates an example of sequential synchronized playback. Here, the seven display items Display #1-#7, which include VPUs #1 and #2 and still items #1-#5, are displayed at the presentation times indicated with respect to each display item.

FIG. 18 illustrates an example of random playback of the seven display items Display #1-#7. Here, the VDP system obtains the presentation time for each display item from the navigation information, but randomly picks which display item to display at each obtained presentation time. FIG. 19 illustrates an example where a first portion of playback is sequential and a second portion of playback is random.

Figure 20:
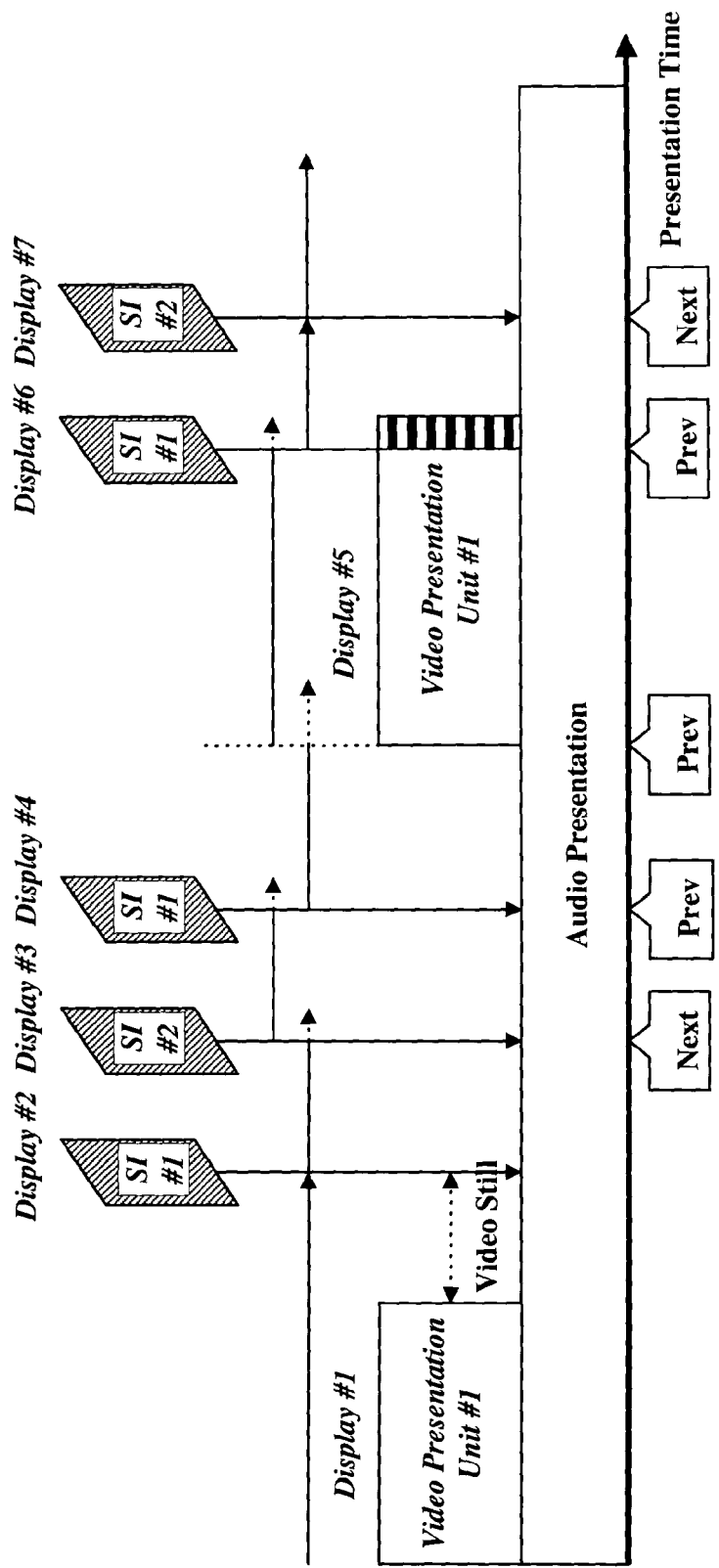
FIG. 20 illustrates an example of a browsable slideshow.

FIG. 20 illustrates an example of a browsable slideshow. In a browsable slideshow, each display item is displayed until user input is received that indicates to change from the displayed display item. With a browsable slideshow, the navigation information indicates the duration of, for example, a still image as infinite. The user input received may indicate to proceed to a next display item or a previous display item. When a browsable slideshow is reproduced with audio data as shown in FIG. 20, no synchronization exists between the audio data and the display items. Instead, the audio data is continuously and repeatedly reproduced during the slideshow. As further shown with respect to VPU #1, if a VPU is reproduced as a display item, and reproduction of the VPU completes before user input to change the display item is received, then the last picture of the VPU is maintained as a still image. As with time-based slideshows, the display of display items may be sequential or random. FIG. 20 illustrates a sequential browsable slideshow.

Next, a more detail description of reproducing a browsable slideshow based on the navigation information will be described. As discussed, a browsable slideshow may be reproduced based on playlist marks defined as still marks. In this example, the controller 10 reproduces a playlist, and based on the navigation information in the playlist, the controller 10 reproduces a still image along with, for example, only audio data. The playlist provides navigation information, for example, a playitem or sub-playitem, for the audio data and provides a still mark linking the still image with the audio data. The controller 10 causes output of the still image until user input instructing the controller 10 to skip to the next or previous still image is received. The controller 10 then reproduces the next or previous still image. This next or previous image may be the next or previous image in a group of images referred to by the still mark, or may be the still image referred to by the next or previous still mark in the playlist. This same browsable slideshow operation may be performed based on still indicators.

A browsable slideshow may also be reproduced based on the playitems or sub-playitems defined as still playitems or sub-playitems. Here, the controller 10 reproduces, for example, only audio data referenced by a non-still playitem or sub-playitem in the playlist, and reproduces a still image or one still image in a group of still images referenced by a still playitem or sub-playitem in the playlist. The controller 10 causes output of the still image until user input instructing the controller 10 to skip to the next or previous still image is received. The controller 10 then reproduces the next or previous still image. This next or previous image may be the next or previous image in a group of images referred to by the current still playitem or still sub-playitem, or may be the still image referred to by the next or previous still playitem or still sub-playitem in the playlist.

As will be appreciated from the forgoing disclosure, the present invention provides a recording medium having a data structure for managing still images recorded on a high-density recording medium (e.g., a high-density optical disk such as a BD-ROM). For example, the data structure allows for displaying movie video and still images or audio and still images in various ways.

As apparent from the above description, the present invention provides methods and apparatuses for recording a data structure on a high density recording medium for managing still images recorded on the recording medium.

The above description further provides methods and apparatus for reproducing still images recorded on a high density recording medium based on a data structure, also recorded on the high density recording medium, for managing the reproduction of still images.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A non-transitory computer-readable medium having a data structure for managing reproduction of still images, comprising:

a data area storing a first clip stream file and a second clip stream file, the first clip stream file including video data for reproducing the still images including a first still image and a second still image, the second clip stream file including audio data;

a playlist area storing at least one playlist file, the playlist file including mark information and at least one playitem and at least one sub-playitem, the mark information providing presentation information on the second still image to provide for at least skipping from reproducing the first still image to reproducing the second still image, the playitem indicating an in-time and an out-time of the first clip stream file for reproducing the first and second still images, the sub-playitem indicating an in-time and an out-time of the second clip stream file for reproducing the audio data, the playitem managing the first and the second still images and the sub-playitem managing the audio data so as to permit independent reproduction of the first and the second still images and the audio data, the playitem including a format indicator indicating a coding format of the first clip stream file, the playlist file including type information indicating whether or not the audio data associated with the sub-playitem is usable for the still images, and the playlist file including first still information indicating whether to display at least one still image for one of a finite and an infinite period of time; and a management area storing at least a first clip information file and a second clip information file, the first clip information file including mapping information between a presentation time and a unit of the first clip stream file, the second clip information file including mapping information between a presentation time and a unit of the second clip stream file, the first and second clip information files corresponding to the first and second clip stream files, respectively.

2. The non-transitory computer-readable medium of claim 1, wherein the mark information includes a first mark associated with the first still image and a second mark associated with the second still image, the first and second marks providing the presentation information on the first and second still images, respectively, and the mark information indicates a number of marks in the mark information.

3. The non-transitory computer-readable medium of claim 2, wherein the first mark includes a first indicator indicating a playitem where the first mark is placed, and wherein the second mark includes a second indicator indicating a playitem where the second mark is placed.

4. The non-transitory computer-readable medium of claim 2, wherein the first mark includes a first indicator indicating a point in a playitem where the first mark is placed and wherein the second mark includes a second indicator indicating a point in a playitem where the second mark is placed.

5. The non-transitory computer-readable medium of claim 2, wherein the first mark includes a type indicator indicating a type of the first mark, and the second mark includes a type indicator indicating a type of the second mark.

6. The non-transitory computer-readable medium of claim 2, wherein the at least one still image is reproduced independently from the audio data based on the playlist file, and the playlist file is separated from the first and second clip stream files.

7. The non-transitory computer-readable medium of claim 1, wherein the playlist file includes second still information indicating a duration of the still image when the first still information indicates to display the still picture for the finite period of time.

8. A method of reproducing a data structure for managing reproduction of still images recorded on a non-transitory computer-readable medium, comprising:
reproducing a first clip stream file and a second clip stream file, the first clip stream file including video data for reproducing the still images including a first still image and a second still image, the second clip stream file including audio data;
reproducing at least one playlist file, the playlist file including mark information and at least one playitem and at least one sub-playitem, the mark information providing presentation information on the second still images to provide for at least skipping from reproducing the first still image to reproducing the second still image, the playitem indicating an in-time and an out-time of the first clip stream file for reproducing the first and second still images, the sub-playitem indicating an in-time and an out-time of the second clip stream file for reproducing the audio data, the playitem managing the first and the second still images and the sub-playitem managing the audio data so as to permit independent reproduction of the first and the second still images and the audio data, the playitem including a format indicator indicating a coding format of the first clip stream file, the plavlist file including type information indicating whether or not the audio data associated with the sub-plavitem is usable for the still images, and the playlist file including first still information indicating whether to display at least one still image for one of a finite and an infinite period of time; and
reproducing at least a first clip information file and a second clip information file, the first clip information file including a mapping information between a presentation time and a unit of the first clip stream file, the second clip information file including mapping information between a presentation time and a unit of the second clip stream file, the first and second clip information files corresponding to the first and second clip stream files, respectively.

9. The method of claim 8, wherein the mark information includes a first mark associated with the first image and a second mark associated with the second image, the first and second marks providing the presentation information on the first and second images, respectively, and the mark information indicates a number of marks in the mark information.

10. The method of claim 9, wherein the first mark includes a first indicator indicating a playitem where the first mark is placed, and wherein the second mark includes a second indicator indicating a playitem where the second mark is placed.

11. The method of claim 9, wherein the first mark includes a first indicator indicating a point in a playitem where the first mark is placed and wherein the second mark includes a second indicator indicating a point in a playitem where the second mark is placed.

12. The method of claim 9, wherein the first mark includes a type indicator indicating a type of the first mark, and the second mark includes a type indicator indicating a type of the second mark.

13. The method of claim 8, wherein the at least one still image is reproduced independently from the audio data based on the playlist file, and the playlist file is separated from the first and second clip stream files.

14. The method of claim 8, wherein the playlist file includes second still information indicating a duration of the still image when the first still information indicates to display the still picture for the finite period of time.

15. An apparatus for reproducing a data structure for managing reproduction of still images recorded on a non-transitory computer-readable medium, comprising:
a pick up configured to reproduce data recorded on the non-transitory computer-readable medium; and
a controller configured to control the pick up to reproduce a first clip stream file and a second clip stream file, the first clip stream file including video data for reproducing the still images including a first still image and a second still image, the second clip stream file including audio data,
the controller configured to control the pick up to reproduce at least one playlist file, the playlist file including mark information and at least one playitem and at least one sub-playitem, the mark information providing presentation information on the second still image to provide for at least skipping from reproducing the first still image to reproducing the second still image, the playitem indicating an in-time and an out-time of the first clip stream file for reproducing the first and second still images, the sub-playitem indicating an in-time and an out-time of the second clip stream file for reproducing the audio data, the playitem managing the first and the second still images and the sub-playitem managing the audio data so as to permit independent reproduction of the first and the second still images and the audio data, the playitem including a format indictor indicating a coding format of the first clip stream file, the playlist file including type information indicating whether or not the audio data associated with the sub-playitem is usable for the still images, and the playlist file including first still information indicating whether to display at least one still image for one of a finite and infinite period of time, and
the controller configured to control the pick up to reproduce a first clip information file including mapping information between a presentation time and a unit of the first clip stream file, and a second clip information file including mapping information between a presentation time and a unit of the second clip stream file, the first and second clip information files corresponding to the first and second clip stream files, respectively.

16. The apparatus of claim 15, wherein the mark information includes a first mark associated with the first image and a second mark associated with the second image, the first and second marks providing the presentation information on the first and second images, respectively, and the mark information indicates a number of marks in the mark information.

17. The apparatus of claim 16, wherein the first mark includes a first indicator indicating at least a stream of data where the first mark is placed; and the second mark includes a second indicator indicating at least a stream of data where the second mark is placed.

18. The apparatus of claim 16, wherein the first mark includes a first indicator indicating a point in a playitem where the first mark is placed and wherein the second mark includes a second indicator indicating a point in a playitem where the second mark is placed.

19. The apparatus of claim 16, wherein the first mark includes a type indicator indicating a type of the first mark, and the second mark includes a type indicator indicating a type of the second mark.

20. The apparatus of claim 15, wherein the at least one still image is reproduced independently from the audio data based on the playlist file, and the playlist file is separated from the first and second clip stream files.

21. The apparatus of claim 15, wherein the playlist file includes second still information indicating a duration of the still image when the first still information indicates to display the still picture for the finite period of time.

22. A method of recording a data structure for managing reproduction of still images on a non-transitory computer-readable medium, comprising:

recording a first clip stream file and a second clip stream file, the first clip stream file including video data for reproducing the still images including a first still image and a second still image, the second clip stream file including audio data;

recording at least one playlist file, the playlist file including mark information and at least one playitem and at least one sub-playitem, the mark information providing presentation information on the second still image to provide for at least skipping from reproducing the first still image to reproducing the second still image, the playitem indicating an in-time and an out-time of the first clip stream file for reproducing the first and the second still images, the sub-playitem indicating an in-time and an out-time of the second clip stream file for reproducing the audio data, the playitem managing the first and the second still images and the sub-playitem managing the audio data so as to permit independent reproduction of the first and the second still images and the audio data, the playitem including a format indicator indicating a coding format of the first clip stream file, the playlist file including type information indicating whether or not the audio data associated with the sub-playitem is usable for the still images, and the playlist file including first still information indicating whether to display at least one still image for one of a finite and an infinite period of time; and recording at least a first clip information file and a second clip information file, the first clip information file including mapping information between a presentation time and a unit of the first clip stream file, the second clip information file including mapping information between a presentation time and a unit of the second clip stream file, the first and second clip information files corresponding to the first and second clip stream files, respectively.

23. The method of claim 22, wherein the mark information includes a first mark associated with the first image and a second mark associated with the second image, the first and second marks providing the presentation information on the first and second images, respectively, and the mark information indicates a number of marks in the mark information.

24. The method of claim 23, wherein the first mark includes a first indicator indicating a playitem where the first mark is placed, and wherein the second mark includes a second indicator indicating a playitem where the second mark is placed.

25. The method of claim 23, wherein the first mark includes a first indicator indicating a point in a playitem where the first mark is placed and wherein the second mark includes a second indicator indicating a point in a playitem where the second mark is placed.

26. The method of claim 23, wherein the first mark includes a type indicator indicating a type of the first mark, and the second mark includes a type indicator indicating a type of the second mark.

27. The method of claim 22, wherein the at least one still image is reproduced independently from the audio data based on the playlist file, and the playlist file is separated from the first and second clip stream files.

28. The method of claim 22, wherein the playlist file includes second still information indicating a duration of the still image when the first still information indicates to display the still picture for the finite period of time.

29. An apparatus for recording a data structure for managing reproduction of still images on a non-transitory computer-readable medium, comprising:

a pick up configured to record data on the non-transitory computer-readable medium; and a controller configured to control the pick up to record a first clip stream file and a second clip stream file, the first clip stream file including video data for reproducing the still images including a first still image and a second still image, the second clip stream file including audio data, the controller configured to control the pick up to record at least one playlist file, the playlist file including mark information and at least one playitem and at least one sub-playitem, the mark information providing presentation information on the second still image to provide for at least skipping from reproducing the first still image to reproducing the second still image, the playitem indicating an in-time and an out-time of the first clip stream file for reproducing the first and second still images, the sub-playitem indicating an in-time and an out-time of the second clip stream file for reproducing the audio data, the playitem managing the first and the second still images and the sub-playitem managing the audio data so as to permit independent reproduction of the first and the second still images and the audio data, the playitem including a format indicator indicating a coding format of the first clip stream file, the playlist file including type information indicating whether or not the audio data associated with the sub-playitem is usable for the still images, and the playlist file including first still information indicating whether to display at least one still image for one of a finite and an infinite period of time, and the controller configured to control the pick up to record a first clip information file including mapping information between a presentation time and a unit of the first clip stream file, and a second clip information file including mapping information between a presentation time and a unit of the second clip stream file, the first and second clip information files corresponding to the first and second clip stream files, respectively.

30. The apparatus of claim 29, wherein the mark information includes a first mark associated with the first image and a second mark associated with the second image, the first and second marks providing the presentation information on the first and second images, respectively, and the mark information indicates a number of marks in the mark information.

31. The apparatus of claim 30, wherein the first mark includes a first indicator indicating a playitem where the first mark is placed, and wherein the second mark includes a second indicator indicating a playitem where the second mark is placed.

32. The apparatus of claim 30, wherein the first mark includes a first indicator indicating a point in a playitem where the first mark is placed and wherein the second mark includes a second indicator indicating a point in a playitem where the second mark is placed.

33. The apparatus of claim 30, wherein the first mark includes a type indicator indicating a type of the first mark, and the second mark includes a type indicator indicating a type of the second mark.

34. The apparatus of claim 29, wherein the at least one still image is reproduced independently from the audio data based on the playlist file, and the playlist file is separated from the first and second clip stream files.

35. The apparatus of claim 29, wherein the playlist file includes second still information indicating a duration of the still image when the first still information indicates to display the still picture for the finite period of time.

* * * * *